(12) United States Patent
Yamamoto et al.

(10) Patent No.: US 12,307,055 B2
(45) Date of Patent: May 20, 2025

(54) ELECTROSTATIC CAPACITANCE TYPE TOUCH PANEL SYSTEM AND METHOD BASED ON ENVIRONMENTAL TEMPERATURE AND SECOND DERIVATIVE OF A PRESSING FORCE

(71) Applicant: Sharp Display Technology Corporation, Kameyama (JP)

(72) Inventors: Takuma Yamamoto, Kameyama (JP); Takenori Maruyama, Kameyama (JP); Shinji Yamagishi, Kameyama (JP); Kazutoshi Kida, Kameyama (JP); Yasuhiro Sugita, Kameyama (JP); Hiroshi Fukushima, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/434,832

(22) Filed: Feb. 7, 2024

(65) Prior Publication Data
US 2024/0302923 A1    Sep. 12, 2024

(30) Foreign Application Priority Data
Mar. 6, 2023    (JP) .................................. 2023-034048

(51) Int. Cl.
*G06F 3/044* (2006.01)
*G06F 3/041* (2006.01)
(52) U.S. Cl.
CPC ............ *G06F 3/044* (2013.01); *G06F 3/0412* (2013.01); *G06F 3/0414* (2013.01)

(58) Field of Classification Search
CPC ....... G06F 3/044; G06F 3/0412; G06F 3/0414
See application file for complete search history.

(56) References Cited

U.S. PATENT DOCUMENTS

| 2017/0123580 A1* | 5/2017 | Chiang | G06F 3/04166 |
| 2018/0095557 A1* | 4/2018 | Wang | G06F 3/0416 |
| 2022/0164060 A1 | 5/2022 | Yamamoto et al. | |
| 2023/0315239 A1* | 10/2023 | Jeon | H10K 59/8791 345/174 |

FOREIGN PATENT DOCUMENTS

JP    2022-083296 A    6/2022

* cited by examiner

*Primary Examiner* — Benjamin C Lee
*Assistant Examiner* — Nathan P Brittingham
(74) *Attorney, Agent, or Firm* — ScienBiziP, P.C.

(57) ABSTRACT

Provided is a touch panel system including a touch panel and a controller. The controller includes a signal acquisition unit that acquires a signal value from a position detection electrode and acquires a signal value from a pressing force detection electrode, a position detection unit that detects a position of a pointer, based on a position signal value acquired by the signal acquisition unit, and a pressing force determination unit that determines a presence or absence of a pressing operation at a pointed position. The pressing force determination unit acquires a second derivative value of a pressing force value and determines the presence or absence of the pressing operation at the pointed position, based on the second derivative value.

7 Claims, 32 Drawing Sheets

ELECTROSTATIC CAPACITANCE TYPE TOUCH PANEL SYSTEM AND METHOD BASED ON ENVIRONMENTAL TEMPERATURE AND SECOND DERIVATIVE OF A PRESSING FORCE

CROSS-REFERENCE TO RELATED APPLICATIONS

This application claims the benefit of priority to Japanese Patent Application Number 2023-034048 filed on Mar. 6, 2023. The entire contents of the above-identified application are hereby incorporated by reference.

BACKGROUND

Technical Field

The disclosure relates to a touch panel system that determines a position of a pointer, such as a finger or a touch pen, and presence or absence of a pressing operation thereby, a display device provided with the touch panel system, and a method for controlling the touch panel system.

In recent years, touch panel systems have become widespread. JP 2022-83296 A discloses a touch panel that detects a position and a pressing force of a pointer such as a finger or a pen.

The touch panel system in JP 2022-83296 A is provided with an electrostatic capacitance type touch panel including a drive electrode, a position detection electrode, and a pressing force detection electrode, and a controller. The controller provides a drive signal to the drive electrode. The controller acquires a position signal value from the position detection electrode and acquires a pressing force signal value from the pressing force detection electrode. The controller detects a position of the pointer, based on the position signal value, and acquires a pressing force generated by the pointer, based on a first derivative value of the pressing force value based on the pressing force signal value.

SUMMARY

Here, an absolute value of the pressing force value changes due to an influence of heat (thermal noise) from the pointer to the touch panel. However, at a normal environmental temperature, a change rate (first derivative value) of the pressing force value due to thermal noise is sufficiently smaller than a change rate (first derivative value) of the pressing force value due to the pressing force of the pointer. Thus, the touch panel system described in JP 2022-83296 A determines the presence or absence of a pressing operation, based on the change rate of the pressing force value, to reduce the influence of thermal noise on the absolute value of the pressing force value.

However, when the touch panel system is used at a low temperature or a high temperature different from a normal environmental temperature, the touch panel system is used in a state where the temperature (environmental temperature) of the touch panel and the temperature of the pointer are greatly different from each other.

The disclosure provides a touch panel system, a display device, and a method for controlling the touch panel system by which it is possible to accurately determine the presence or absence of a pressing operation even when a temperature difference between a pointer and a touch panel is large and the temperature of the touch panel changes due to the pointer touching the touch panel.

In order to solve the above-described problems, a touch panel system according to a first aspect of the disclosure includes an electrostatic capacitance type touch panel including a drive electrode, a position detection electrode, and a pressing force detection electrode, and a controller configured to control the electrostatic capacitance type touch panel, in which the controller provides a drive signal to the drive electrode, acquires a signal value from the position detection electrode, acquires a signal value from the pressing force detection electrode, detects a pointed position by a pointer, based on the signal value acquired from the position detection electrode, acquires a second derivative value of a pressing force value based on the signal value acquired from the pressing force detection electrode, and determines a presence or absence of a pressing operation at the pointed position, based on the second derivative value of the pressing force value.

A display device according to a second aspect is a display device including a touch panel system and a display configured to display an image, the touch panel system being disposed on a display surface of the display, in which the touch panel system includes an electrostatic capacitance type touch panel including a drive electrode, a position detection electrode, and a pressing force detection electrode, and a controller configured to control the electrostatic capacitance type touch panel, and the controller provides a drive signal to the drive electrode, acquires a signal value from the position detection electrode, acquires a signal value from the pressing force detection electrode, detects a pointed position by a pointer, based on the signal value acquired from the position detection electrode, acquires a second derivative value of a pressing force value based on the signal value acquired from the pressing force detection electrode, and determines a presence or absence of a pressing operation at the pointed position, based on the second derivative value of the pressing force value.

A method for controlling a touch panel system according to a third aspect is a method for controlling a touch panel system including an electrostatic capacitance type touch panel including a drive electrode, a position detection electrode, and a pressing force detection electrode, the method including providing a drive signal to the drive electrode, acquiring a signal value from the position detection electrode, acquiring a signal value from the pressing force detection electrode, detecting a pointed position by a pointer, based on the signal value acquired from the position detection electrode, acquiring a second derivative value of a pressing force value based on the signal value acquired from the pressing force detection electrode, and determining a presence or absence of a pressing operation at the pointed position, based on the second derivative value of the pressing force value.

In the touch panel system, the display device, and the method for controlling the touch panel system having the above-described configurations, it is possible to accurately determine a presence or absence of a pressing operation even when a temperature difference between a pointer and a touch panel is large and the temperature of the touch panel changes due to the pointer touching the touch panel.

BRIEF DESCRIPTION OF DRAWINGS

The disclosure will be described with reference to the accompanying drawings, wherein like numbers reference like elements.

DESCRIPTION OF EMBODIMENTS

Figure 1:
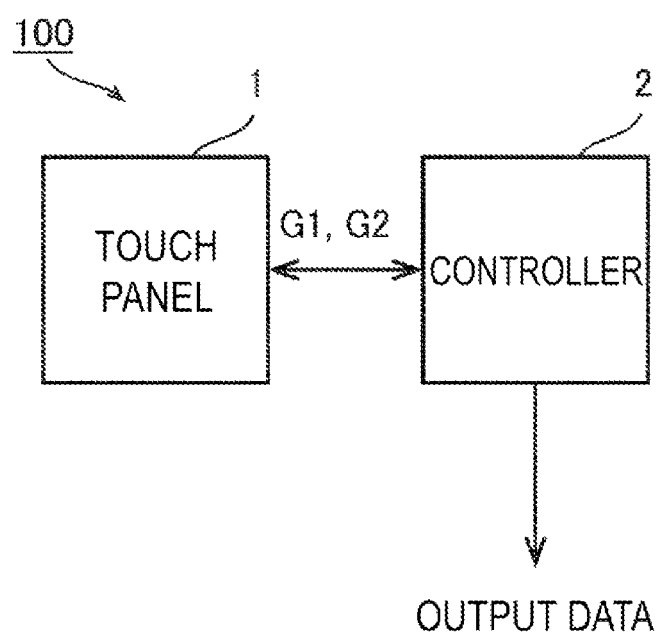
FIG. 1 is a block diagram illustrating a configuration of a touch panel system according to a first embodiment.

Hereinafter, embodiments of the disclosure will be described in detail with reference to the drawings. In the drawings, the same or corresponding portions are denoted by the same reference signs, and the description thereof will not be repeated. Note that, for ease of description, in the drawings referred to below, configurations may be simplified or schematically illustrated, and some components may be omitted. Further, dimensional ratios between components illustrated in the drawings are not necessarily indicative of actual dimensional ratios. Further, in the drawings referred to below, various electrodes are displayed with hatching in order to facilitate the identification of the various electrodes.

First Embodiment

FIG. 1 describes a configuration of a touch panel system 100 according to a first embodiment. FIG. 1 is a block diagram illustrating the configuration of the touch panel system 100 according to the first embodiment.

As illustrated in FIG. 1, the touch panel system 100 includes a touch panel 1 and a controller 2. The touch panel 1 is configured as an electrostatic capacitance type touch panel and is configured to output a position signal value G1 indicating a position of a pointer and a pressing force signal value G2 indicating a pressing force generated by the pointer. The controller 2 provides a drive signal to the touch panel 1, acquires the position signal value G1 and the pressing force signal value G2 from the touch panel 1, and based on the position signal value G1 and the pressing force signal value G2, determines a position touched by the pointer (hereinafter, "pointed position") and the presence or absence of a pressing operation at the pointed position. The controller 2 transmits, as output data, to a control unit of a display device 101 (see FIG. 2) provided with the touch panel system 100, a determination result of the pointed position and the presence or absence of the pressing operation at the pointed position. The output data is used for, for example, controlling an image displayed by the display device 101.

Figure 2:
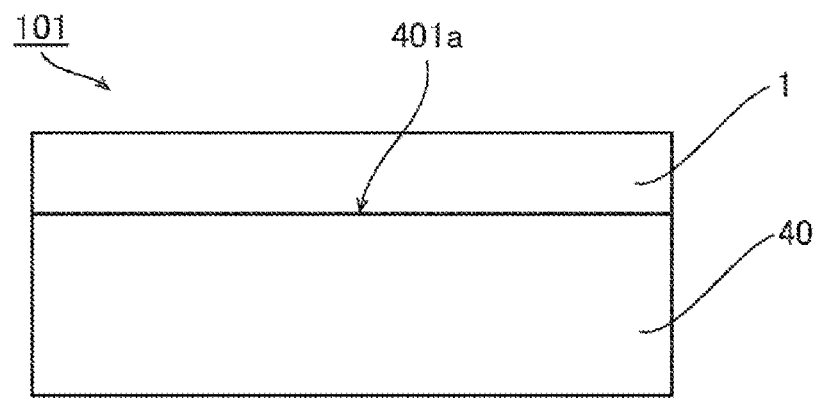
FIG. 2 is a cross-sectional view illustrating a configuration of a display device including the touch panel system according to the first embodiment.

FIG. 2 is a cross-sectional view illustrating a configuration of the display device 101 including the touch panel system 100 according to the first embodiment. As illustrated in FIG. 2, the display device 101 includes the touch panel 1 and a display 40 configured to display an image on a display surface 401a. The display 40 is formed of a liquid crystal display or an organic electro luminescence (EL) display, for example.

Structure of Touch Panel

Figure 3:
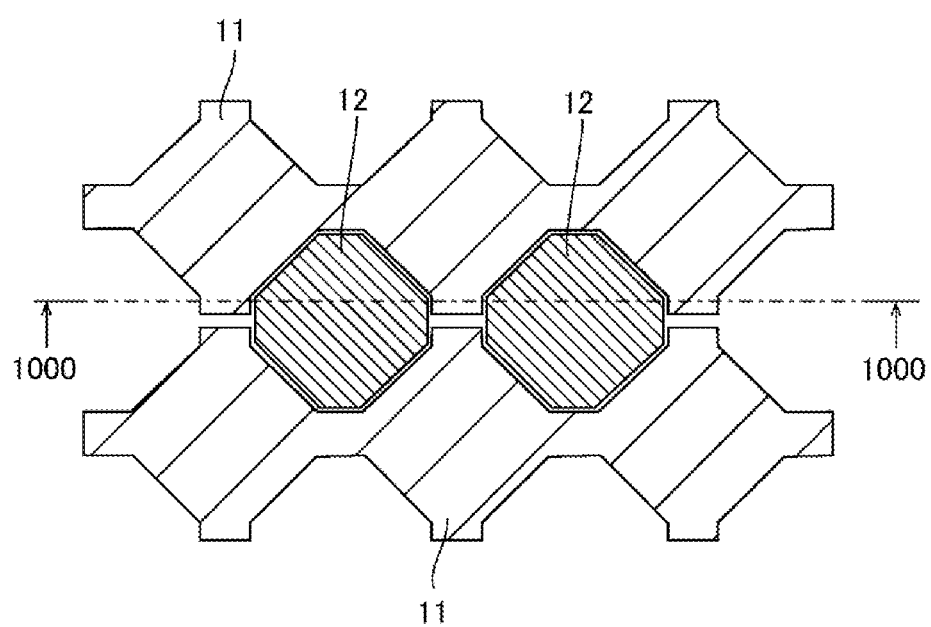
FIG. 3 is a plan view illustrating a configuration of a drive electrode included in a touch panel.
Figure 4:
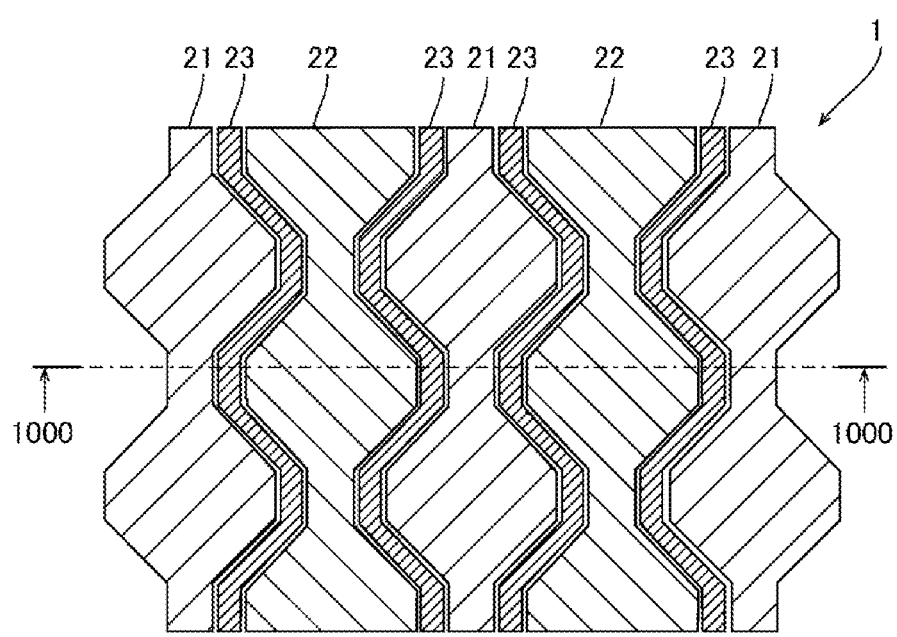
FIG. 4 is a plan view illustrating configurations of a position detection electrode and a pressing force detection electrode included in the touch panel.
Figure 5:
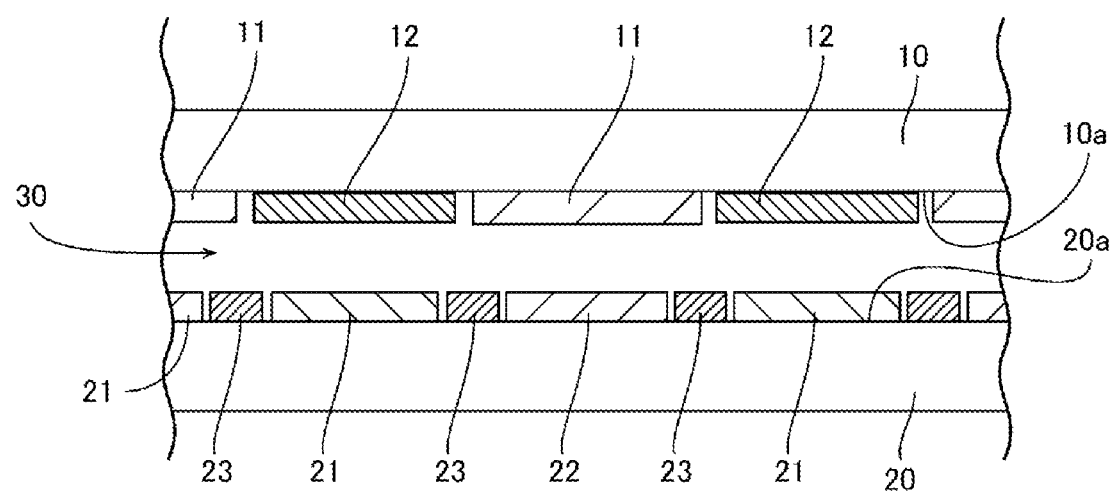
FIG. 5 is a cross-sectional view taken along a line 1000-1000 in FIGS. 3 and 4.

FIGS. 3 and 4 are plan views illustrating configurations of electrodes included in the touch panel 1 according to the first embodiment. FIG. 5 is a cross-sectional view taken along a line 1000-1000 in FIGS. 3 and 4. Note that for the sake of convenience in illustration, the electrodes included in the touch panel 1 are illustrated separately in FIGS. 3 and 4; however, as illustrated in FIG. 5, the electrodes illustrated in FIGS. 3 and 4 are layered.

As illustrated in FIG. 5, the touch panel 1 includes a first substrate 10, a drive electrode 11, a floating island electrode 12, a second substrate 20, a position detection electrode 21, a pressing force detection electrode 22, a shield electrode 23, and a pressure sensitive member 30 (dielectric layer). For example, the first substrate 10 and the second substrate 20 are formed of a transparent material such as a glass polyethylene terephthalate (PET) film. In addition, the drive electrode 11, the floating island electrode 12, the position detection electrode 21, the pressing force detection electrode 22, and the shield electrode 23 are formed of a conductive transparent material such as Indium Tin Oxide (ITO). The pressure sensitive member 30 is formed of a transparent material having elasticity such as a polymer material, an optical clear adhesive (OCA), or an optical clear resin (OCR).

The first substrate 10 and the second substrate 20 are disposed such that a first surface 10a of the first substrate 10 and a second surface 20a of the second substrate 20 face each other. The drive electrode 11 is an electrode to which a drive signal is provided and is formed on the first surface 10a. The floating island electrode 12 is in a floating state and is formed on the first surface 10a.

The position detection electrode 21 is an electrode for detecting the position of the pointer and is formed on the second surface 20a. The pressing force detection electrode 22 is an electrode for detecting the magnitude of the pressing force generated by the pointer and is formed on the second surface 20a. The shield electrode 23 is provided with a potential equal to a ground potential or equal to a potential provided to the position detection electrode 21 or the pressing force detection electrode 22, or is in a floating state, and is formed on the second surface 20a.

As illustrated in FIG. 3, the drive electrode 11 has a shape (a diamond pattern) in which a plurality of rhombus-shaped electrodes are connected to each other in a diagonal direction of the electrodes. In addition, the floating island electrode 12 is constituted by a plurality of rhombus-shaped electrodes D2 that are not connected to each other. Note that the drive electrode 11 and the floating island electrode 12 are not limited to the rhombic shape, and may have a triangular shape, a polygonal shape other than the rhombic shape, a circular shape, or an elliptical shape.

As illustrated in FIG. 4, similarly to the drive electrode 11, the position detection electrode 21 has a diamond pattern in which a plurality of rhombus-shaped electrodes are connected to each other. Further, the pressing force detection electrode 22 also has a diamond pattern in which a plurality of rhombus-shaped electrodes are connected to each other. A connecting direction of the rhombus-shaped electrodes in the position detection electrode 21 and a connecting direction of the rhombus-shaped electrodes in the pressing force detection electrode 22 are parallel to each other, and the position detection electrode 21 and the pressing force detection electrode 22 are alternately disposed with respect to a direction perpendicular to the connecting directions. The connecting direction of the rhombus-shaped electrodes in each of the position detection electrode 21 and the pressing force detection electrode 22 is perpendicular to the connecting direction of the rhombus-shaped electrodes in the drive electrode 11. Note that the position detection electrode 21 and the pressing force detection electrode 22 are not limited to the rhombic shape and may have a triangular shape, a polygonal shape other than a rhombic shape, a circular shape, or an elliptical shape.

As illustrated in FIGS. 4 and 5, the shield electrode 23 is disposed between the position detection electrode 21 and the pressing force detection electrode 22. For example, the shield electrode 23 is disposed between the position detection electrode 21 and the pressing force detection electrode 22 to separate these electrodes from each other.

When the second substrate 20 is viewed from the first substrate 10 in a plan view (hereinafter, simply referred to as a "plan view"), the drive electrode 11 covers at least a part of the pressing force detection electrode 22. Note that in the touch panel 1 exemplified in FIGS. 3 to 5, in a plan view, one rhombus-shaped electrode constituting the drive electrode 11 contains one rhombus-shaped electrode constituting the pressing force detection electrode 22. Similarly, in a plan view, one rhombus-shaped electrode constituting the floating island electrode 12 contains one rhombus-shaped electrode constituting the position detection electrode 21.

Operation of Touch Panel

Figure 6:
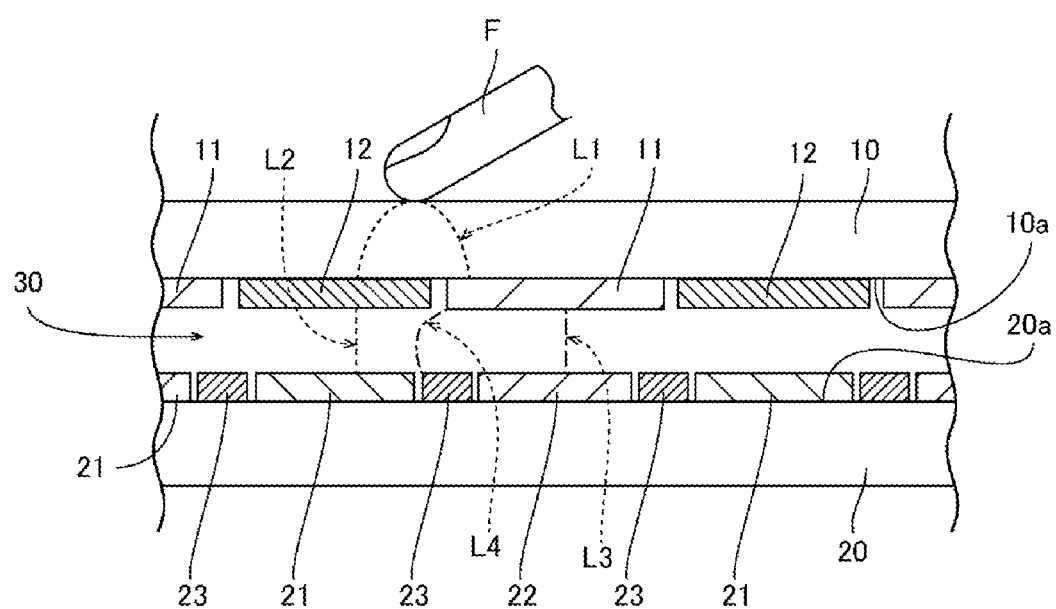
FIG. 6 is a diagram for describing an operation of the touch panel.

Next, operation of the touch panel 1 will be described with reference to FIG. 6. In FIG. 6, electrical lines of force corresponding to capacitive coupling occurring between a pointer F and various electrodes and capacitive coupling occurring between the various electrodes are indicated by dashed lines L1 and L2 and a dashed-dotted line L3. As illustrated in FIG. 6, when the pointer F comes into contact with a surface, of the first substrate 10, opposite to the first surface 10a, as indicated by the dashed line L1, the drive electrode 11 and the floating island electrode 12 are capacitively coupled to each other. At this time, as indicated by the dashed line L2, since the floating island electrode 12 and the position detection electrode 21 are capacitively coupled to each other, the drive electrode 11 and the position detection electrode 21 are capacitively coupled to each other via the floating island electrode 12. As a result, the electrostatic capacitance between the drive electrode 11 and the position detection electrode 21 decreases via the pointer F, and this results in a change in the position signal value G1 detected at the position detection electrode 21. The controller 2 detects the position of the pointer F, based on the change in the position signal value G1.

As indicated by the dashed-dotted line L3 in FIG. 6, the drive electrode 11 and the pressing force detection electrode 22 are capacitively coupled to each other. Here, when the first substrate 10 is pressed by the pointer F, the pressure sensitive member 30 is a material having elasticity, and thus, the distance between the drive electrode 11 and the pressing force detection electrode 22 is reduced at a pressed portion. As a result, the electrostatic capacitance between both electrodes 11 and 22 increases, and this results in a change in the pressing force signal value G2 detected at the pressing force detection electrode 22. The controller 2 determines the presence or absence of the pressing operation at the pointed position by the pointer F, based on the change in the pressing force signal value G2.

When the first substrate 10 is pressed by the pointer F, the distance between the drive electrode 11 and the position detection electrode 21 is also reduced. However, since the drive electrode 11 is closer to the shield electrode 23 than to the position detection electrode 21, the drive electrode 11 is likely to be capacitively coupled to the shield electrode 23 as indicated by the dashed-dotted line L4 in FIG. 6. Thus, electrostatic capacitance between the drive electrode 11 and the position detection electrode 21 is less likely to increase, and the decrease in electrostatic capacitance between both electrodes 11 and 12 due to the pointer F is less likely to be canceled out.

In addition, since the pointer F is closer to the shield electrode 23 than to the pressing force detection electrode 22 on a path from the pointer F to the pressing force detection electrode 22, the pointer F is likely to be capacitively coupled to the shield electrode 23. Thus, the pointer F is suppressed from being capacitively coupled to each of the drive electrode 11 and the pressing force detection electrode 22, and this suppresses fluctuation in electrostatic capacitance between both the electrodes.

Configuration of Controller

Figure 7:
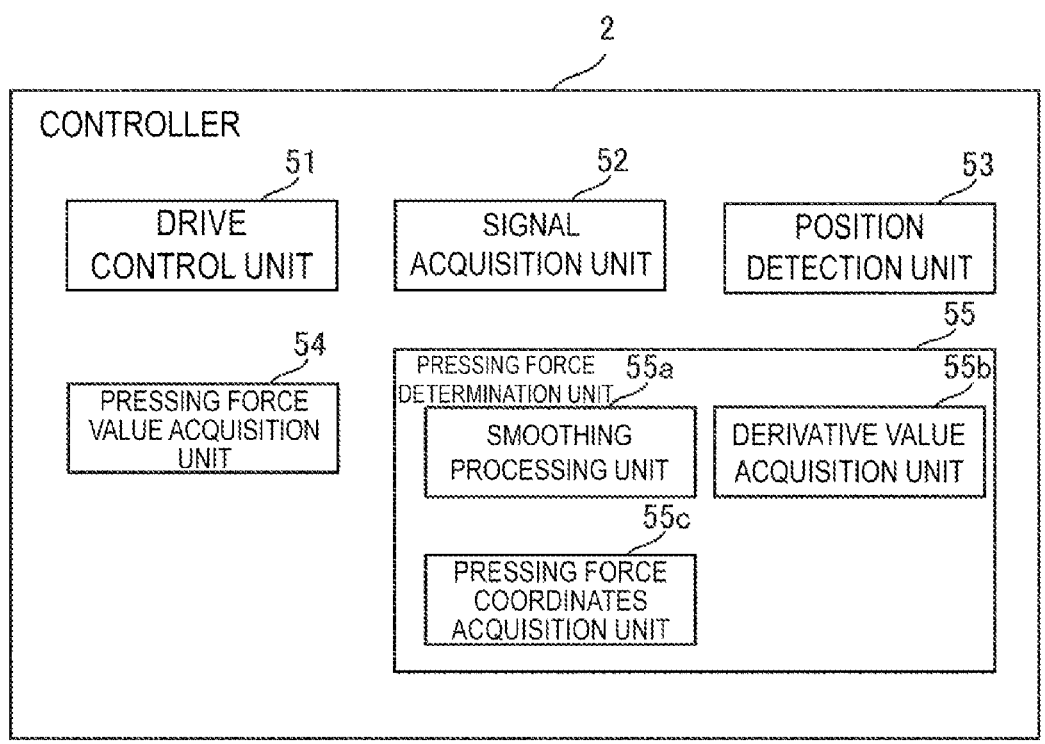
FIG. 7 is a functional block diagram of a controller according to the first embodiment.

Next, a configuration of the controller 2 will be described with reference to FIG. 7 to FIG. 16B. FIG. 7 is a functional block diagram of the controller 2. The controller 2 includes a processor (control circuit) that performs control processing of the touch panel system 100 by executing a program. As illustrated in FIG. 7, the controller 2 functions as a drive control unit 51, a signal acquisition unit 52, a position detection unit 53, a pressing force value acquisition unit 54, and a pressing force determination unit 55.

Configuration of Drive Control Unit

The drive control unit 51 transmits a drive signal to the touch panel 1, for each unit time (one frame period). For example, the drive control unit 51 sequentially transmits a drive signal to the drive electrodes 11 of the touch panel 1. "One frame period" means a period (a period of one cycle) during which a drive signal is transmitted to all of the drive electrodes 11 of the touch panel 1.

Configuration of Signal Acquisition Unit

Figure 8:
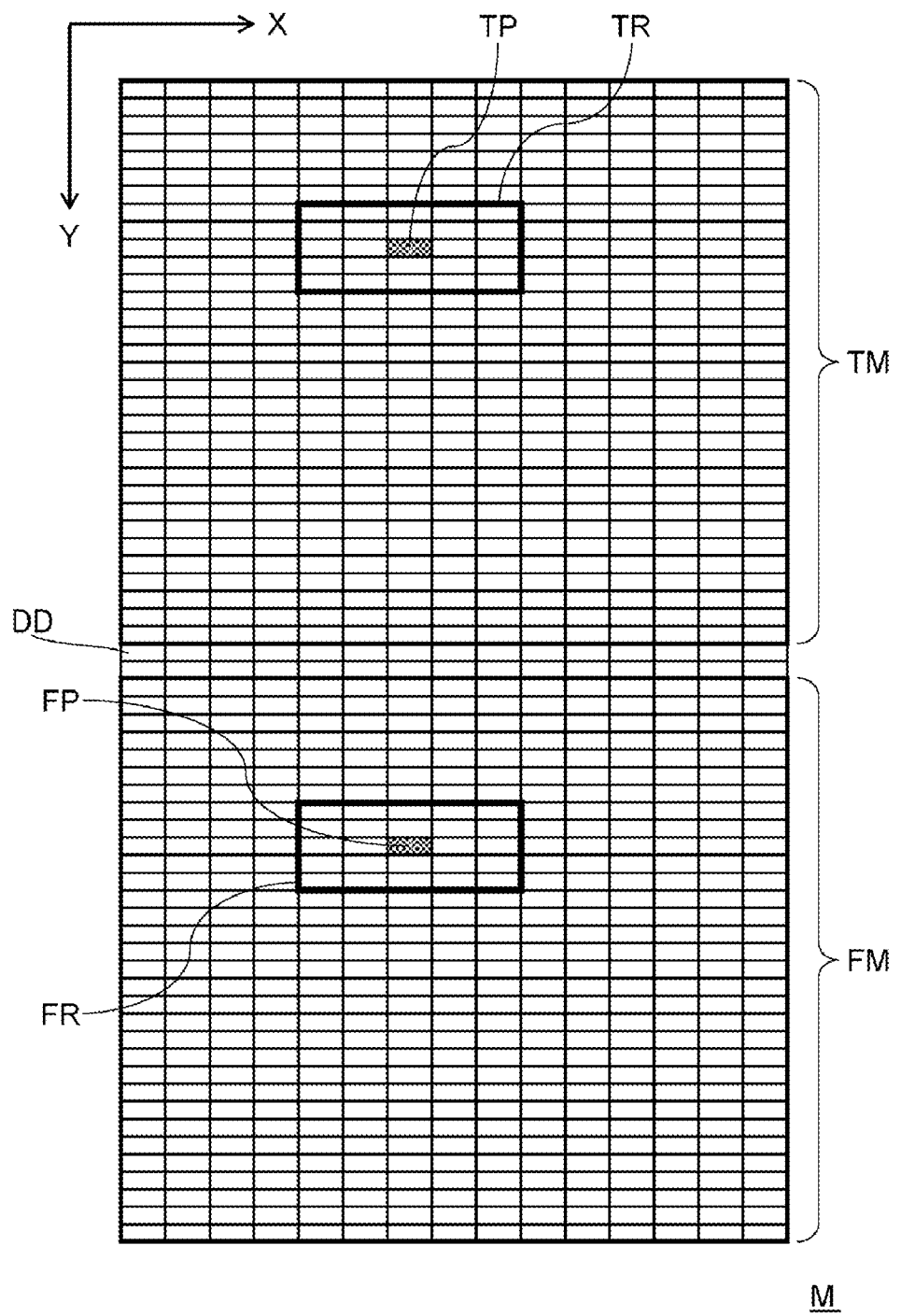
FIG. 8 is a schematic view illustrating a configuration example of input data processed by the controller.

The signal acquisition unit 52 generates a data map M using the acquired position signal value G1 and pressing force signal value G2. The data map M will now be described with reference to FIG. 8. The data map M illustrated in FIG. 8 is data acquired when 15 drive electrodes 11, 32 position detection electrodes 21, and 32 pressing force detection electrodes 22 are provided. The data map M is data including elements represented by two-dimensional coordinates of (X, Y). An X direction is a direction in which the drive electrodes 11 are aligned, and a Y direction is a direction in which the position detection electrodes 21 and the pressing force detection electrodes 22 are aligned. Note that, in the following, a direction in which the value of Y increases will be represented as a downward direction, and a direction in which the value of Y decreases will be represented as an upward direction.

The data map M is data in which the position signal values G1 and the pressing force signal values G2 are arranged in different regions of one two-dimensional coordinate system and combined. In the data map M illustrated in FIG. 8, a position detection map TM in which the position signal values G1 acquired from the position detection electrodes 21 are aligned and a pressing force detection map FM in which the pressing force signal values G2 acquired from the pressing force detection electrodes 22 are aligned are each arranged in different regions such that the position detection map TM is on the upper side and the pressing force detection map FM is on the lower side, with two rows of dummies DD interposed between the maps TM and FM at a central portion in the Y direction. As illustrated in FIG. 4, the position detection electrodes 21 and the pressing force detection electrodes 22 are alternately aligned; however, the position signal values G1 and the pressing force signal values G2 are arranged separated from each other. In the data map M illustrated in FIG. 8, the position signal value G1 corresponding to an electrostatic capacitance formed by the X-th drive electrode 11 and the Y-th position detection electrode 21, with one corner on the touch panel 1 serving as the origin, is an element of (X, Y). The pressing force signal value G2 corresponding to an electrostatic capacitance formed by the X-th drive electrode 11 and the Y-th pressing force detection electrode 22 is an element of (X, Y+34).

Hereinafter, description will be given with reference to a case where, in the data map M, when the surface of the touch panel 1 is pressed by the pointer F, the position signal value G1 of an element corresponding to the vicinity of the center of a contact portion of the pointer F in the position detection map TM increases to a positive value, and the pressing force signal value G2 of the element corresponding to the vicinity of the center of the contact portion of the pointer F in the pressing force detection map FM also increases to a positive value.

Configuration of Position Detection Unit

As illustrated in FIG. 8, the position detection unit 53 detects a position TP of the pointer F from within the position detection map TM of the data map M. Here, in the first embodiment, when the position signal value G1 becomes equal to or greater than a position detection threshold value G1$t$ continuously for a plurality of frame periods (for example, three frame periods), the position detection unit 53 detects, as the position TP of the pointer F, among the elements in the position detection map TM, an element that is equal to or greater than the position detection threshold value G1$t$ of the fourth frame and is the maximum among the elements in the position detection map TM. According to this configuration, since detection is performed when the position signal value G1 is equal to or greater than the position detection threshold value G1$t$ continuously for a plurality of times, it is possible to prevent the erroneous position from being erroneously detected as the position of the pointer F when the position signal value G1 becomes equal to or greater than the position detection threshold value G1$t$ only once due to noise. Note that in a case where there is no element in which the position signal value G1 is equal to or greater than the position detection threshold value G1$t$ in the position detection map TM, the position detection unit 53 determines that there is no pointer F that is in contact with the touch panel 1.

Figure 9:
FIG. 9 is a schematic view (1) illustrating a method for calculating a detailed position of a pointer by the controller.
Figure 10:
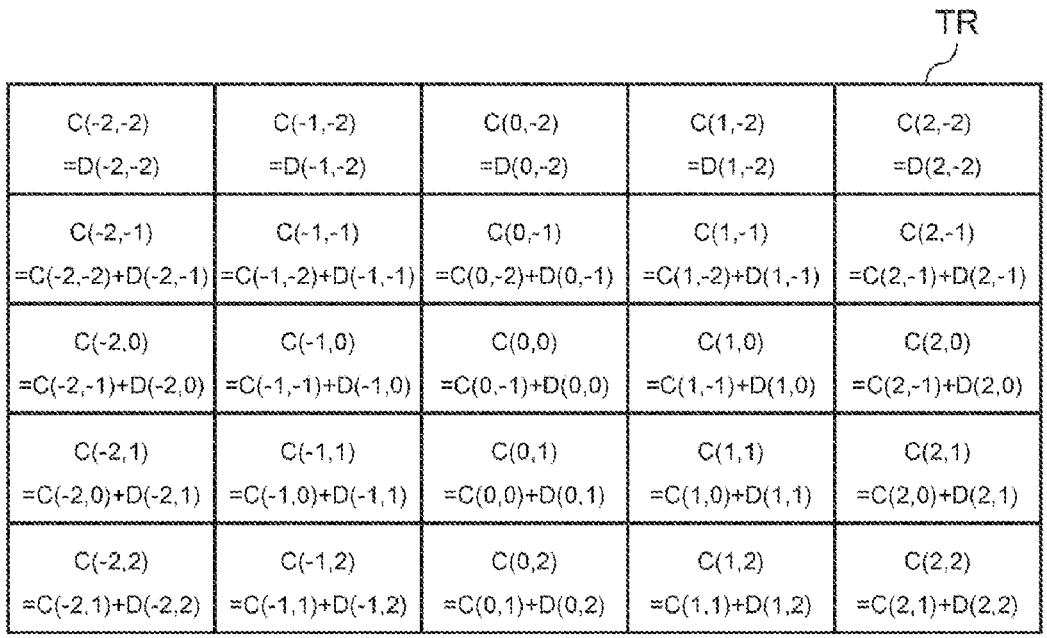
FIG. 10 is a schematic view (2) illustrating a method for calculating a detailed position of the pointer by the controller.

The position detection unit 53 calculates the detailed position of the pointer F. The "detailed position" means a position of a center of gravity in a predetermined range (position detection range TR) centered around the position TP at which a maximum value in the position detection map TM is obtained. A method for calculating the detailed position by the position detection unit 53 will be described with reference to FIG. 9 and FIG. 10. FIG. 9 and FIG. 10 are schematic views illustrating a method for calculating the detailed position of the pointer F by the controller 2. Note that in FIG. 9 and FIG. 10, the position TP of the pointer F is set to (0, 0).

As illustrated in FIG. 8 and FIG. 9, the position detection unit 53 sets a position detection range TR having a size of A×B so as to include the position TP of the pointer F. FIGS. 8 and 9 illustrate a case where a region having a size of 5×5 is set as the position detection range TR, with the position TP of the pointer F serving as the center. Note that, in a case where the position detection range TR having a size of 5×5 is set with the position TP of the pointer F serving as a center and a portion of the position detection range TR protrudes from the position detection map TM, the position detection range TR may be set smaller than a size of 5×5 by removing the protruding portion, or may be set to have a size of 5×5 but fit within the position detection map TM by shifting the position TP of the pointer F from the center.

The position detection unit 53 calculates a signal value C(X, Y) by cumulatively adding a signal value D(X, Y) in the position detection range TR in the Y direction. Specifically, the position detection unit 53 calculates the signal value C(X, Y) using C(X, Y)=C(X, Y−1)+D(X, Y). However, in the calculation of the signal value C(X, Y), the position detection unit 53 sets C(X, Y)=D(X, Y) for elements at the upper end of the position detection range TR for which C(X, Y−1) cannot be calculated.

The position detection unit 53 calculates the position of the center of gravity of the calculated signal value C(X, Y) based on the magnitude of the signal value and the coordinate (X, Y), and sets the position of the center of gravity as the detailed position of the pointer F. When the detailed position of the pointer F is calculated in this way, the position of the pointer F which is present between the coordinates (X, Y) can be detected, and thus a resolution for detecting the position of the pointer F can be improved.

Configuration of Pressing Force Value Acquisition Unit

The pressing force value acquisition unit 54 acquires a provisional value, based on the pressing force signal value G2, and acquires a value (a pressing force value Z) which is a value obtained by amplifying the provisional value. Specifically, as illustrated in FIG. 8, the pressing force value acquisition unit 54 sets a pressing force detection range FR in the pressing force detection map FM of the data map M. The pressing force value acquisition unit 54 sets the pressing force detection range FR having a size of C×D so as to include the position TP of the pointer F. FIG. 8 illustrates a case where a region having a size of 5×5 is set as the pressing force detection range FR, with a position FP in the pressing force detection map FM corresponding to the position TP of the pointer F serving as the center. In the example illustrated in FIG. 8, an X coordinate of the position FP is the same as that of the position TP, and a Y coordinate of the position FP is a value acquired by adding 34 to the Y coordinate of the position TP. Note that, in a case where the pressing force detection range FR having a size of 5×5 is set with the position FP serving as a center and a portion of the pressing force detection range FR protrudes from the pressing force detection map FM, the pressing force detection range FR may be set smaller than a size of 5×5 by removing the protruding portion, or may be set to have a size of 5×5 but fit within the pressing force detection map FM without centering on the position FP.

The pressing force value acquisition unit 54 calculates a provisional value of the magnitude of the pressing force generated by the pointer F, based on the pressing force signal value G2 within the pressing force detection range FR. For example, the pressing force value acquisition unit 54 calculates the provisional value by summing the absolute values of the pressing force signal values G2 within the pressing force detection range FR. Note that the method for calculating the provisional value including the method for setting the pressing force detection range FR is preferably such that, for example, when the pointer F, which has a constant contact area, is pressed against the touch panel 1 while changing the pressing force, the provisional value is preferably a value proportional to the pressing force.

Then, the pressing force value acquisition unit 54 calculates the pressing force value Z, which is a value obtained by amplifying the provisional value. The pressing force value acquisition unit 54 may calculate the pressing force value Z by multiplying the provisional value by the amplification ratio and then adding or subtracting the offset value.

Configuration of Pressing Force Determination Unit

As illustrated in FIG. 7, the pressing force determination unit 55 includes a smoothing processing unit 55a, a derivative value acquisition unit 55b, and a pressing force coordinates acquisition unit 55c. That is, the controller 2 executes a program to function as the smoothing processing unit 55a, the derivative value acquisition unit 55b, and the pressing force coordinates acquisition unit 55c.

Configuration of Smoothing Processing Unit

Figure 11:
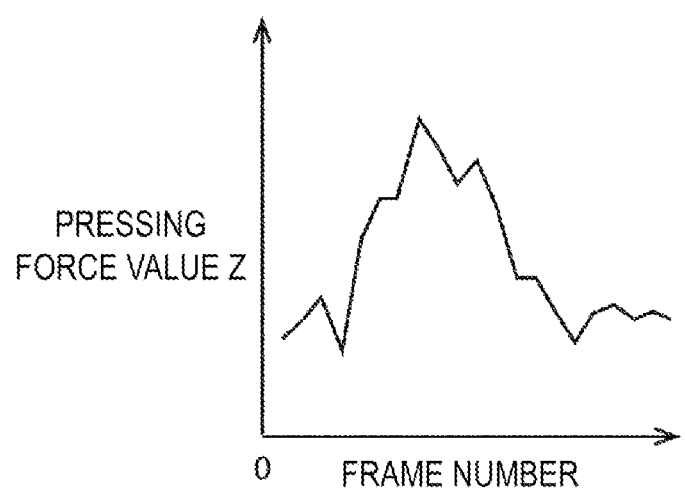
FIG. 11 is a graph showing an example of pressing force values for individual frames.

The smoothing processing unit 55a smooths the pressing force value Z calculated by the pressing force value acquisition unit 54 to acquire a smoothed pressing force value Za. FIG. 11 shows an example of pressing force values Z acquired in a plurality of frame periods (for example, 21 frames). Here, unlike the position detection unit 53 configured to detect the position of the pointer from the fourth frame, the smoothing processing unit 55a performs processing of smoothing from a point in time (first frame) when the position signal value G1 is equal to or greater than the position detection threshold value G1t.

Figure 12:
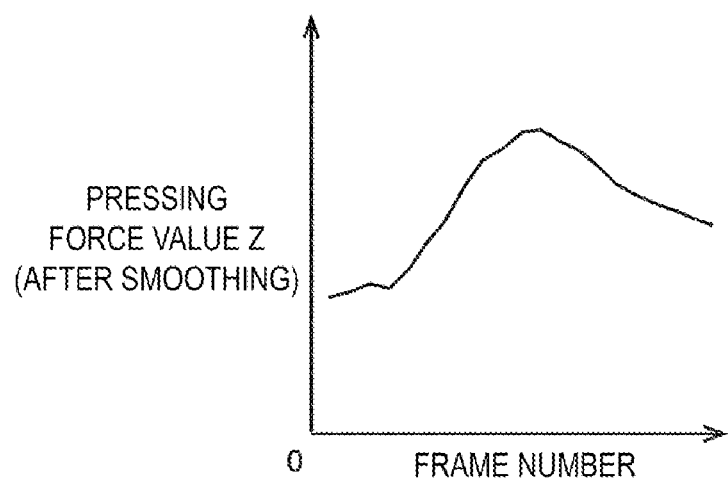
FIG. 12 is a graph showing an example of smoothed pressing force values for individual frames.

FIG. 12 is an example of the smoothed pressing force value Za of FIG. 11. The smoothing processing unit 55a acquires the smoothed pressing force value Za represented by the following Equation (1), where a point in time when the position signal value G1 becomes equal to or greater than the position detection threshold value G1t is a first frame (first point in time), a pressing force value Z of the pressing force signal value G2 acquired N frames after (where N is a natural number) from the first frame is Z1, and a pressing force value Z of the pressing force signal value G2 acquired one frame before from the N-th point in time is Z2. According to this Equation (1), as a point in time comes closer to the first point in time (first frame) (as N becomes smaller), the smoothing is performed more strongly, and thus the influence of noise can be reduced even immediately after the first point in time.

$$Za = \{(N-1)/N\} \times Z2 + (1/N) \times Z1 \tag{1}$$

Figure 13:
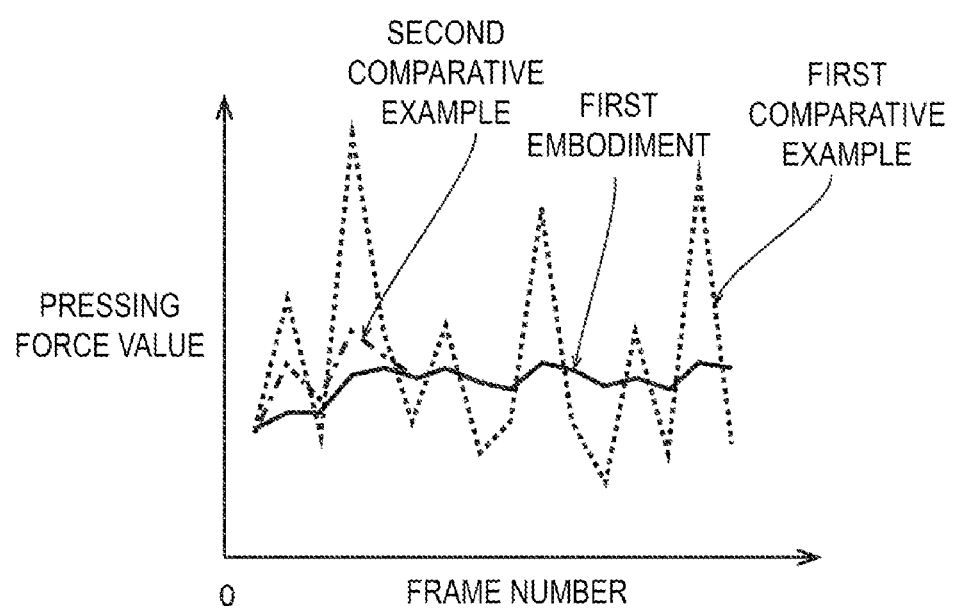
FIG. 13 is a graph for explaining an effect of a smoothing processing unit.

FIG. 13 is a graph showing results of comparison with comparative examples for describing an effect of the smoothing processing unit 55a. A first comparative example is a graph showing fluctuation in the pressing force values Z before smoothing. In a second comparative example, the first frame to the third frame are the average values of the pressing force value Z in the latest frame and the pressing force value Z of one frame before. The fourth frame to the (N−1)-th frame are the average values of the pressing force value Z of the last four frames from the latest frame, and the N-th and subsequent frames are frames on which a smoothing process similar to that of the first embodiment was performed. As a result, it has been found that while the fluctuation of the values of the second comparative example is more reduced as compared with the pressing force values Z of the first comparative example before smoothing, the fluctuation of the smoothed pressing force values Za according to the first embodiment is more significantly suppressed as compared with the second comparative example. According to the configuration according to the first embodiment, it has been found that the influence of noise can be reduced even immediately after the first point in time.

Configuration of Derivative Value Acquisition Unit

In the first embodiment, the derivative value acquisition unit 55b acquires a second derivative value B based on the smoothed pressing force value Za acquired by the pressing force value acquisition unit 54 and the smoothing processing unit 55a. In the present embodiment, the "second derivative" is a concept including not only a case where a value (first derivative value) obtained by differentiating the pressing force value Za with respect to time (number of frames) is differentiated again with respect to time but also a case where the second derivative value is directly obtained based on the pressing force value Za by using Equation (5) described later without obtaining the first derivative value. The "first derivative" means that the pressing force value Za is differentiated with respect to time.

Figure 14A:
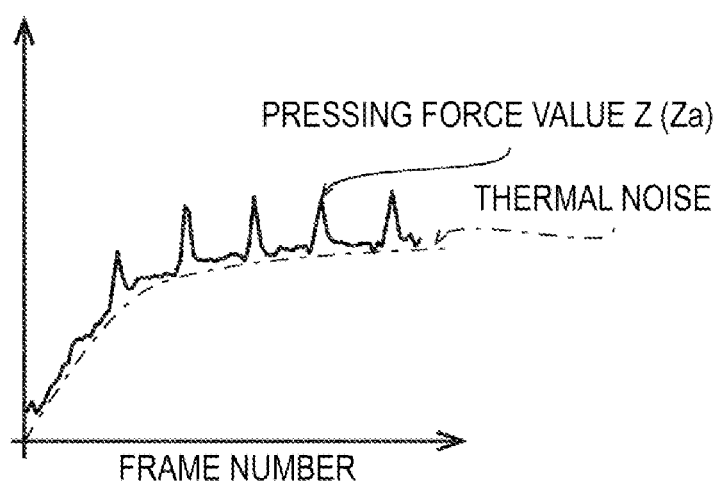
FIG. 14A is a graph for explaining that a value of thermal noise is superimposed on the pressing force value.

As shown in FIG. 14A, a value generated due to thermal noise (dotted line portion in FIG. 14A) is superimposed on the smoothed pressing force value Za (and the unsmoothed pressing force value Z). That is, the dielectric constant of the pressure sensitive member 30 changes due to transferring of the heat of the pointer to the pressure sensitive member 30, and the smoothed pressing force value Za (and the unsmoothed pressing force value Z) changes due to the change in the dielectric constant. That is, when the temperature of the pressure sensitive member 30 rises, the electrostatic capacitance changes and the pressing force value Z acquired from the pressing force detection electrode 22 changes even though the pointer does not press down the first substrate 10.

Figure 14B:
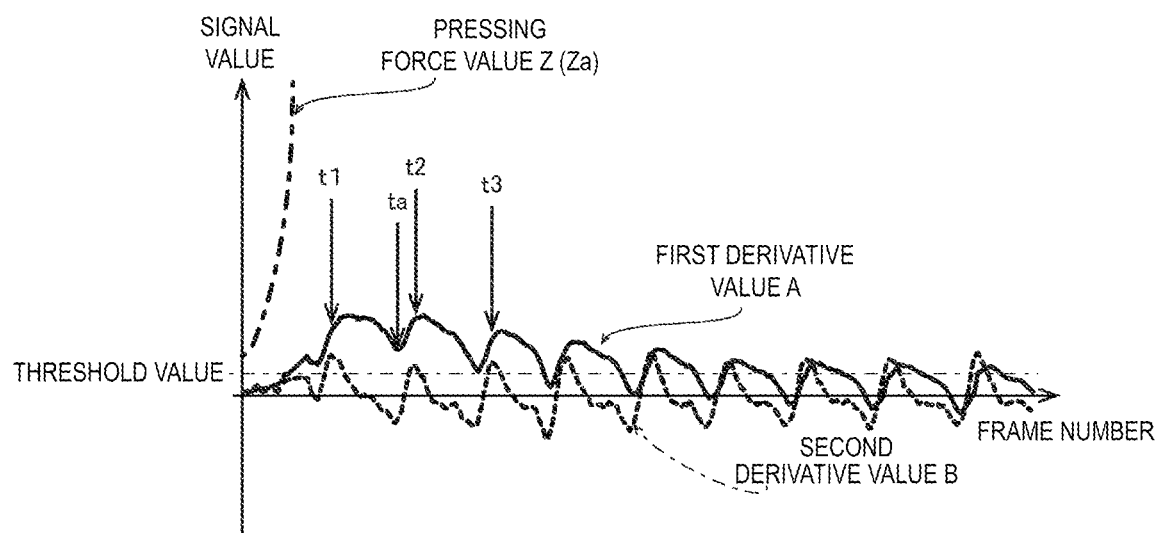
FIG. 14B is a graph for explaining a signal waveform of a first derivative value and a signal waveform of a second derivative value.

FIG. 14B shows waveforms of signal values of the smoothed pressing force value Za (hereinafter, simply referred to as "pressing force value Za"), a first derivative value A, and a second derivative value B when the pressing force generated by the pointer is repeated from a state in which the temperature of the touch panel 1 is equal to the environmental temperature. Results in FIG. 14B were obtained at the environmental temperature of −30 degrees Celsius. The pressing force value Za continues to increase due to the influence of thermal noise, as in the case of FIG. 14A. Although the influence of thermal noise on the first derivative value A is reduced as compared with the pressing force value Za, the first derivative value A exceeds a threshold value also at a point in time ta different from the points in time t1, t2, and t3 at which the touch panel 1 is pressed, and the pressing force is erroneously detected at the point in time ta. Note that the "threshold value" is a reference value for determining that the touch panel is pressed when the signal value changes from less than the threshold value to greater than or equal to the threshold value. The influence of thermal noise is further reduced in the second derivative value B as compared with the first derivative value A, and while the signal values at the points in time t1, t2, and t3 at which the touch panel 1 is pressed exceed the threshold values, the signal value is less than the threshold value (and less than 0) at the point in time ta. That is, it is possible to prevent the influence of thermal noise by determining the presence or absence of the pressing operation, based on the second derivative value B.

Figure 15:
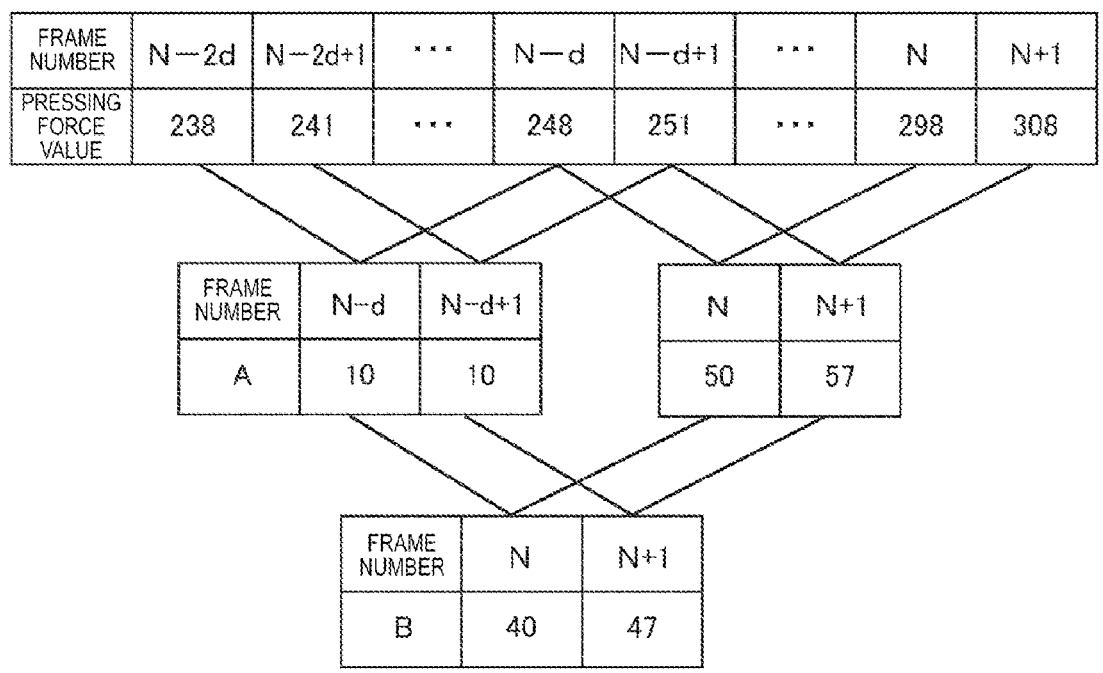
FIG. 15 is a table for describing a method for evaluating the second derivative value.

FIG. 15 is a table for describing an example of acquisition (calculation) of the second derivative value B. In the first embodiment, for example, the derivative value acquisition unit 55b acquires the first derivative value A of the pressing force value Za, and evaluates the second derivative value B, based on the first derivative value A. Similarly to the smoothing processing unit 55a, the derivative value acquisition unit 55b performs processing for acquiring the second derivative value B from a point in time (first frame) when the position signal value G1 is equal to or greater than the position detection threshold value G1t.

Specifically, as shown in FIG. 15, the derivative value acquisition unit 55b acquires the first derivative value A by subtracting a past pressing force value Za from a latest pressing force value Za. Here, the "past pressing force value Za" is the pressing force value Za calculated based on the pressing force signal value G2 acquired from the pressing force detection electrode 22 d frames before (natural number) from a point in time (frame) when the latest pressing force signal value G2 is acquired. The "latest pressing force value Za" is the pressing force value Za acquired most recently from among the acquired pressing force values Za. Although d is a natural number equal to or greater than 2 in the example of FIG. 15, d may be 1. When the latest pressing force value Za is a pressing force value Za(N), the past pressing force value Za is a pressing force value Za(N−d). The derivative value acquisition unit 55b calculates the first derivative value A, for each frame, based on Equation (2) below. Where, the first derivative value A of an Nth frame is A(N). The first derivative value A of an (N−d)th frame is defined as A (N−d).

$$A(N) = Za(N) - Za(N - d) \qquad (2)$$

$$A(N - d) = Za(N - d) - Za(N - 2d) \qquad (3)$$

Next, the derivative value acquisition unit 55b evaluates the second derivative value B by evaluating a difference between the first derivative value A(N) and the first derivative value A(N−d). That is, the derivative value acquisition unit 55b calculates the second derivative value B, for each frame, based on Equation (4) below. Note that the derivative value acquisition unit 55b may evaluate the second derivative value B directly from the pressing force value Za(N), the pressing force value Za(N−d), and the pressing force value Za(N−2d) without evaluating the first derivative value A(N) and the first derivative value A (N−d) as shown in the following Equation (5).

$$B(N) = A(N) - A(N - d) \qquad (4)$$

$$B(N) = Za(N) - 2 \times Za(N - d) + Za(N - 2d) \qquad (5)$$

Note that the value of d may be changed by the controller 2, based on an input operation from an operator. The value of d is desirably 1 or greater and 6 or less from a viewpoint of reducing the influence of thermal noise and a characteristic of responsiveness. The "input operation from an operator" may be an input operation on the touch panel 1 by the operator, or may be an input operation by the operator to an operation unit (not illustrated) provided separately from the touch panel 1. As the value of the natural number d set becomes larger, the signal increases. However, since the number of pressing force values Z to be stored increases, the load on the memory (not illustrated) of the controller 2 increases. According to such a configuration, the value of the natural number d may be set arbitrarily, and thus, in a case where absolute values (signals) of the first derivative value A and the second derivative value B are set to be large, the natural number d may be set to be large, and in a case where the load on the memory is to be reduced, the natural number d may be set to be small.

Configuration of Pressing Force Coordinates Acquisition Unit

Figure 16:
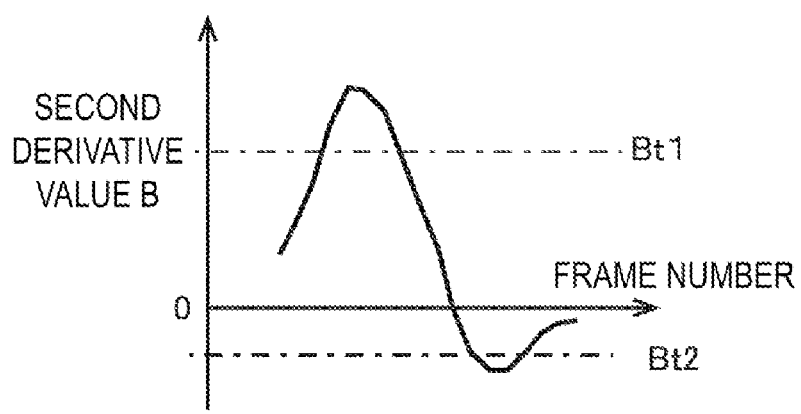
FIG. 16 is a graph for describing determination of a presence or absence of a pressing operation of the pointer and determination of a release of the pressing operation of the pointer.

As shown in FIG. 16, the pressing force coordinates acquisition unit 55c compares the second derivative value B with a pressing force detection threshold value Bt1 to determine that the pressing operation has been performed on the pointed position by the pointer. Specifically, when the pointer presses the touch panel 1, the second derivative value B increases. When the second derivative value B is equal to or greater than the pressing force detection threshold value Bt1, the pressing force determination unit 55 determines that the touch panel 1 is pressed by the pointer at the position FP.

Upon the second derivative value B being equal to or greater than the pressing force detection threshold value Bt1, the pressing force determination unit 55 compares the second derivative value B and a pressing force release detection threshold value Bt2 to determine that the pressing operation at the pointed position has been released. Specifically, when a pressing force of the pointer F pressing the touch panel 1 is weakened, the second derivative value B decreases. Next, when the second derivative value B is equal to or greater than the pressing force release detection threshold value Bt2, the pressing force determination unit 55 determines that the pressing operation at the position FP has been released. The pressing force release detection threshold value Bt2 is a value smaller than the pressing force detection threshold value Bt1.

According to the above configuration, even when a temperature difference between the pointer and the touch panel 1 is large and the first derivative value A of the pressing force value due to the thermal noise is large, the presence or absence of the pressing operation at the pointed position is determined based on the second derivative value B, and thus it is possible to prevent the thermal noise from being erroneously detected as the pressing operation as shown in FIG. 14B.

Method for Controlling Touch Panel System

Figure 17:
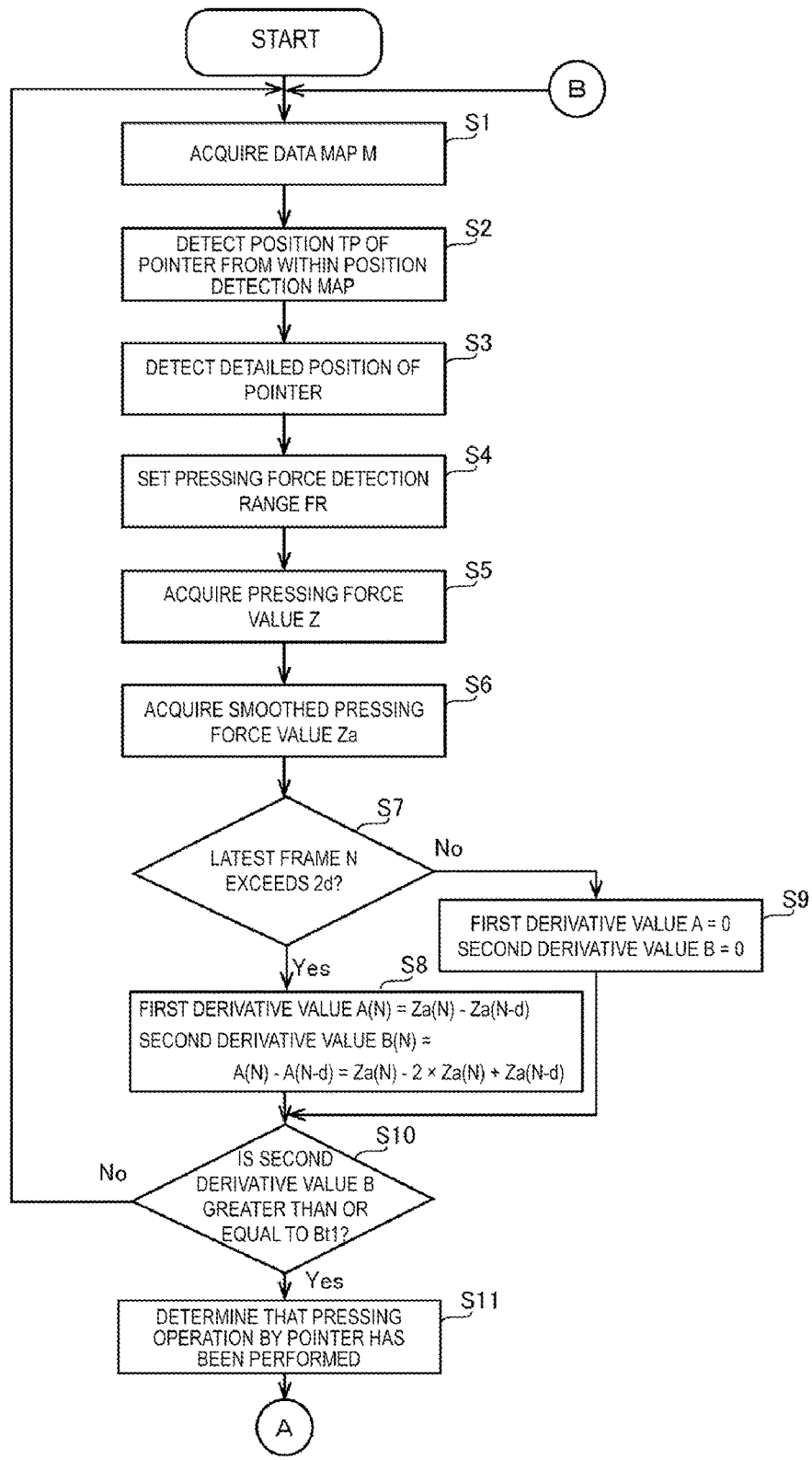
FIG. 17 is a flowchart (1) illustrating control processing performed by a controller 2 included in the touch panel system according to the first embodiment.
Figure 18:
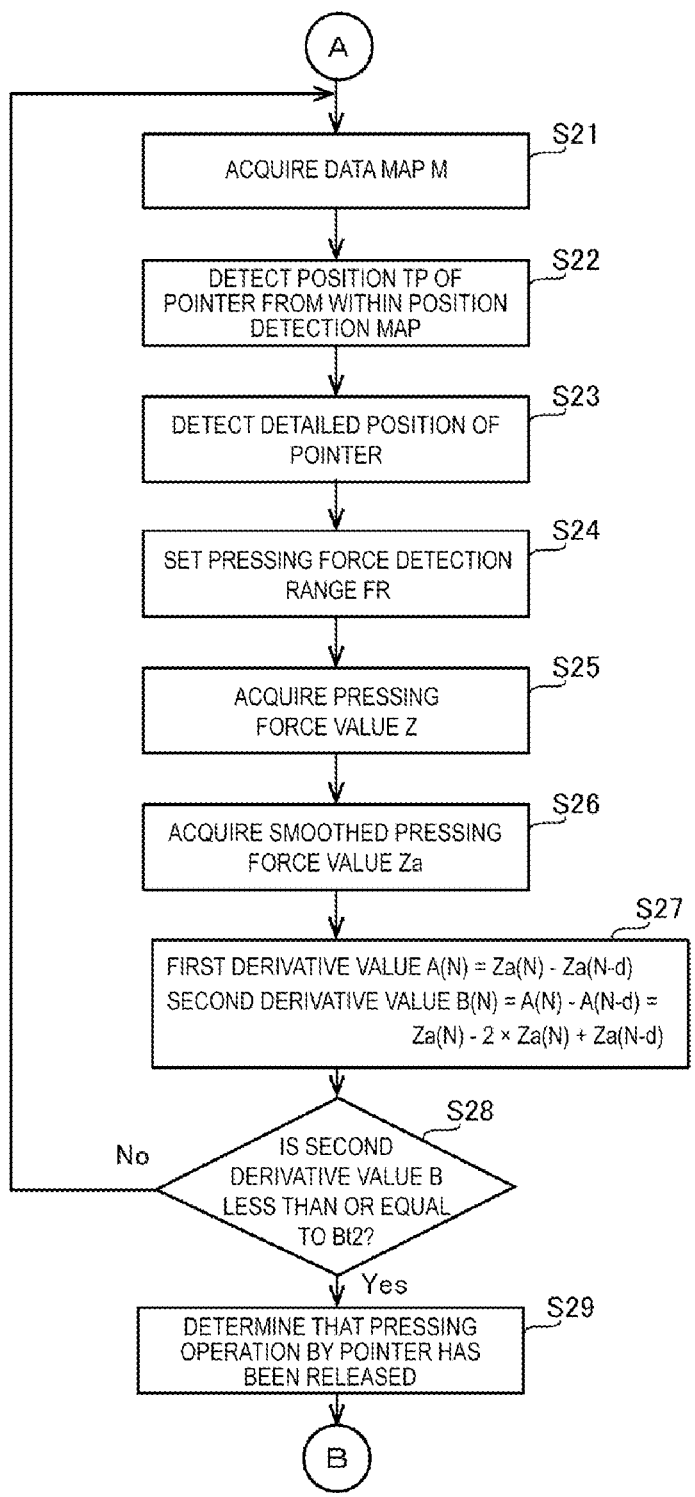
FIG. 18 is a flowchart (2) illustrating the control processing performed by the controller 2 included in the touch panel system according to the first embodiment.

Next, a method for controlling the touch panel system 100 will be described with reference to FIGS. 17 and 18. FIGS. 17 and 18 are diagrams illustrating a flow of control processing of the touch panel system 100. The control processing of the touch panel system 100 described below is performed by the controller 2.

As illustrated in FIG. 17, in step S1, the data map M is acquired. In other words, the position signal value G1 and the pressing force signal value G2 are acquired from the touch panel 1.

In step S2, the position TP of the pointer is detected from within the position detection map TM. Subsequently, in step S3, a detailed position of the pointer is calculated, and output data including information on the detailed position of the pointer is transmitted to the display device 101. The "detailed position" means a position of a center of gravity in a predetermined range (position detection range TR) centered around the position TP at which a maximum value in the position detection map TM is obtained.

In step S4, the pressing force detection range FR is set based on the position TP of the pointer. Subsequently, in step S5, the pressing force value Z is calculated. Subsequently, in step S6, the pressing force value Z is smoothed and the smoothed pressing force value Za is acquired.

In step S7, it is determined whether the latest frame N exceeds a natural number 2d (twice d). If the latest frame N exceeds the natural number 2d, then the process proceeds to step S8, and if the latest frame N does not exceed the natural number 2d, then the process proceeds to step S9.

In step S8, the first derivative value A of the pressing force value Za is calculated based on the above Equation (2), and the second derivative value B is calculated based on the above Equation (4). Note that the second derivative value B may be calculated based on the above Equation (5). On the other hand, in step S9, the second derivative value B (and the first derivative value A) are set to 0. Subsequently, the process proceeds to step S10.

In step S10, it is determined whether the first derivative value A is equal to or greater than the pressing force detection threshold value Bt1. If the first derivative value A is equal to or greater than the pressing force detection threshold value Bt1, then the process proceeds to step S11. If the first derivative value A is less than the pressing force detection threshold value Bt1, then the process returns to step S1 to acquire the data map M in a next frame period.

In step S11, it is determined that the pressing operation at the pointed position has been performed by the pointer at the pointed position FP, and the output data including information indicating that the pressing operation has been performed by the pointer at the position FP is transmitted to the display device 101. Subsequently, the process proceeds to step S21 (see FIG. 18).

As illustrated in FIG. 18, in step S21, the data map M is acquired. Subsequently, in step S22, the position TP of the pointer is detected from within the position detection map TM. Subsequently, in step S23, a detailed position of the pointer is calculated, and output data including information on the detailed position of the pointer is transmitted to the display device 101.

In step S24, the pressing force detection range FR is set based on the position TP of the pointer. Subsequently, in step S25, the pressing force value Z is calculated. Next, in step S26, the pressing force value Z is smoothed. Subsequently, in step S27, the second derivative value B of the smoothed pressing force value Za is calculated.

In step S28, it is determined whether the second derivative value B is equal to or less than the pressing force release detection threshold value Bt2. If the second derivative value B is equal to or less than the pressing force release detection threshold value Bt2, then the process proceeds to step S29. If the second derivative value B is greater than the pressing force release detection threshold value Bt2, then the process returns to step S21 to acquire the data map M in a next frame period.

In step S29, it is determined that the pressing operation at the pointed position by the pointer has been released, and the output data including information indicating that the pressing operation by the pointer has been released is transmitted to the display device 101. Subsequently, the process returns to step S1 (see FIG. 17).

Thus, even when the temperature difference between the pointer and the touch panel 1 is large and the first derivative value A of the pressing force value due to the thermal noise is large, the presence or absence of the pressing operation at the pointed position is determined based on the second derivative value B, and thus it is possible to prevent the thermal noise from being erroneously detected as the pressing operation as shown in FIG. 14B.

Second Embodiment

Next, with reference to FIGS. 19 and 20, a configuration of a touch panel system 200 of a second embodiment will be described. The touch panel system 200 of the second embodiment is provided with a function to determine whether based on the first derivative value A or the second derivative value B, the pressing operation is determined present or absent, based on an environmental temperature Te, in addition to the configuration of the touch panel system 100 of the first embodiment. Note that, in the following description, when the same reference numerals as those in the first embodiment are used, similar configurations to those in the first embodiment are described, and reference is made to the preceding description unless otherwise described.

Figure 19:
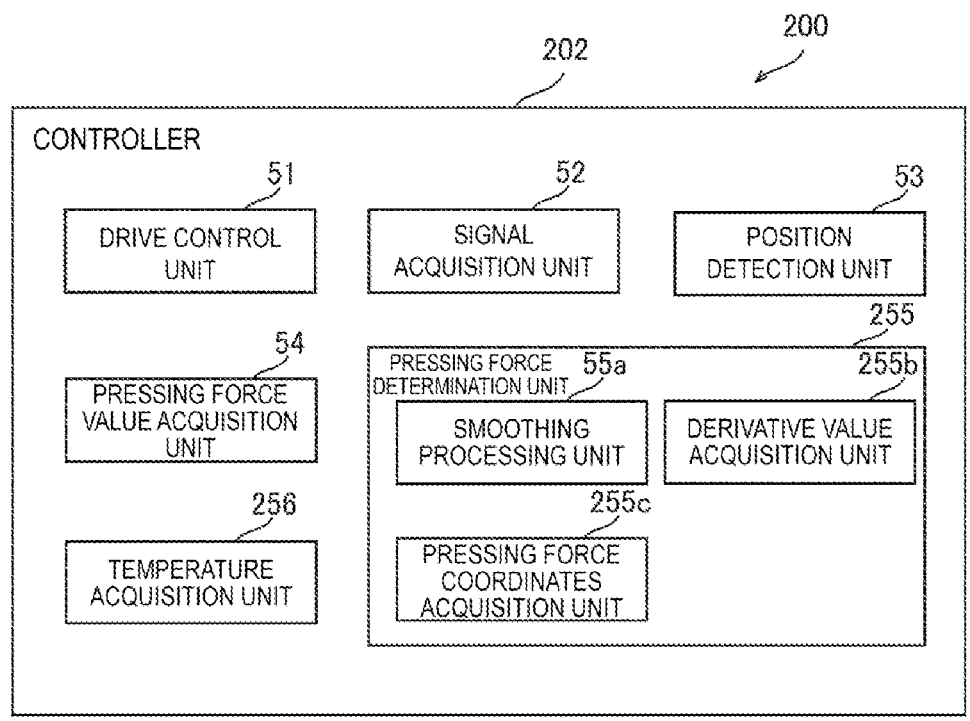
FIG. 19 is a functional block diagram of a controller of a touch panel system according to a second embodiment.

FIG. 19 is a functional block diagram of a controller 202 of the touch panel system 200. The controller 202 includes a pressing force determination unit 255 and a temperature acquisition unit 256.

Figure 20:
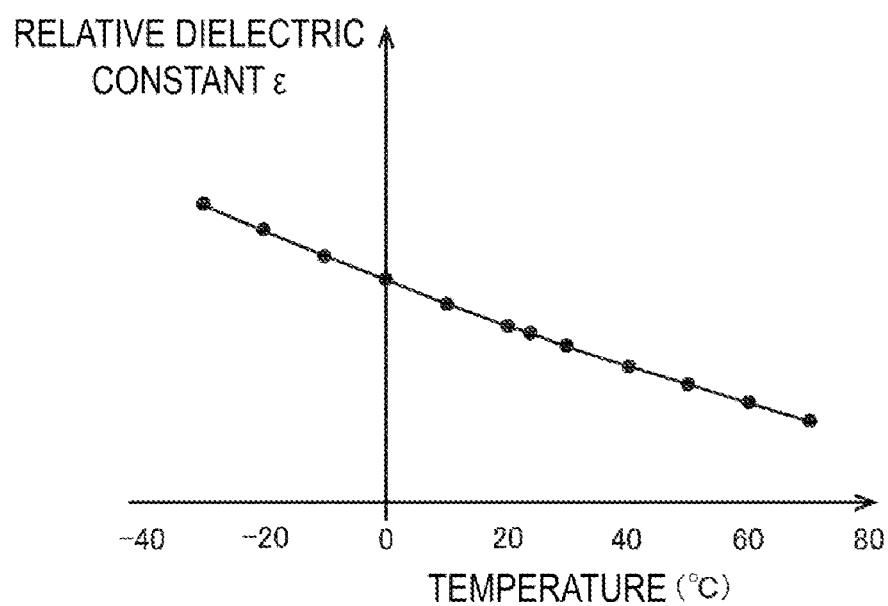
FIG. 20 is a graph for describing temperature dependency of a relative dielectric constant of a pressure sensitive member.

FIG. 20 is a graph for describing temperature dependency of a relative dielectric constant ε of the pressure sensitive member 30 of the touch panel 1. The temperature acquisition unit 256 acquires a capacitance value CL of the pressure sensitive member 30 (see FIG. 5) and acquires the environmental temperature Te, based on the capacitance value CL of the pressure sensitive member 30. According to such a configuration, it is possible to acquire the environmental temperature Te without newly providing a temperature detector (temperature sensor). As illustrated in FIG. 20, the relative dielectric constant ε of the pressure sensitive member 30 has a temperature dependency, and thus, the relative dielectric constant ε changes in accordance with a change in temperature, changing the capacitance value CL. Therefore, the temperature acquisition unit 256 according to the second embodiment evaluates the relative dielectric constant ε by measuring the capacitance value CL, and acquires the environmental temperature Te, based on the relative dielectric constant ε. For example, the controller 202 includes a table in which the relative dielectric constant ε (or the capacitance value CL) and the environmental temperature Te shown in FIG. 20 are associated with each other in advance. Next, the temperature acquisition unit 256 acquires the capacitance value CL and the relative dielectric constant ε, and refers to the table to acquire the environmental temperature Te corresponding to the relative dielectric constant ε. Here, the "environmental temperature Te" refers to the temperature of the touch panel 1 (pressure sensitive member 30) before the touch panel 1 is touched by the pointer.

As illustrated in FIG. 19, the pressing force determination unit 255 includes a derivative value acquisition unit 255b and a pressing force coordinates acquisition unit 255c. The derivative value acquisition unit 255b evaluates the first derivative value A when the environmental temperature Te is within a temperature range R, and evaluates the second derivative value B when the environmental temperature Te is outside the temperature range R. When the environmental temperature Te is within the temperature range R, the pressing force coordinates acquisition unit 255c determines the presence or absence of the pressing operation, based on the first derivative value A, and when the environmental temperature Te is outside the temperature range R, the pressing force coordinates acquisition unit 255c determines the presence or absence of the pressing operation, based on the second derivative value B. The temperature range R includes a temperature of the pointer (for example, 20 degrees Celsius to 40 degrees Celsius). The temperature range R is, for example, a range of equal to or greater than 0 degrees Celsius and equal to or less than 60 degrees Celsius. Note that the temperature range R is not limited to such an example, and may include a temperature lower than 0 degrees Celsius or a temperature higher than 60 degrees Celsius.

According to the configuration of the second embodiment, when the environmental temperature Te is within the temperature range R, the temperature difference between the pointer and the touch panel 1 is small, and so the influence of thermal noise is small, and thus it is possible to prevent the thermal noise from being erroneously detected as the pressing operation even by the method of determining the presence or absence of the pressing operation at the pointed position, based on the first derivative value of the pressing force value. As a result, when the environmental temperature Te is within the temperature range R, it is possible to reduce the processing load of the pressing force determination unit 255. When the environmental temperature Te is outside the temperature range R, it is possible to prevent the thermal noise from being erroneously detected as the pressing operation by determining the presence or absence of the pressing operation at the pointed position, based on the second derivative value B.

Control Method According to Second Embodiment

Next, with reference to FIGS. 21 to 25, a method for controlling the touch panel system 200 according to the second embodiment will be described. The method for controlling the touch panel system 200 is executed by the controller 202. Note that control processing similar to that in the first embodiment is denoted by the same step numbers, and description thereof will be omitted.

Figure 21:
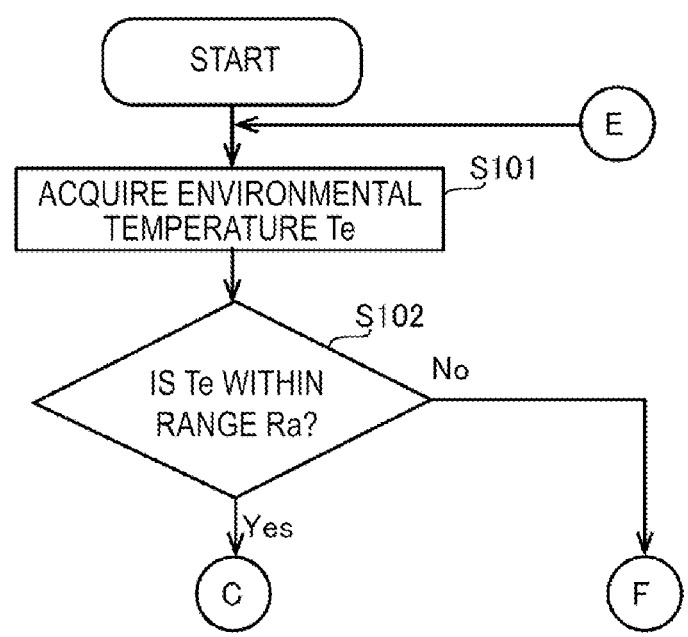
FIG. 21 is a flowchart (1) illustrating control processing according to the second embodiment.

As illustrated in FIG. 21, in step S101, the environmental temperature Te is acquired. Specifically, the capacitance value CL (relative dielectric constant ε) of the pressure sensitive member 30 is acquired, and based on the capacitance value CL (relative dielectric constant ε) of the pressure sensitive member 30, the environmental temperature Te is acquired. Next, in step S102, it is determined whether the environmental temperature Te is within the temperature range R. When the environmental temperature Te is within the temperature range R, the process proceeds to step S1 illustrated in FIG. 22. When the environmental temperature Te is outside the temperature range R, the process proceeds to step S1 illustrated in FIG. 24.

Figure 22:
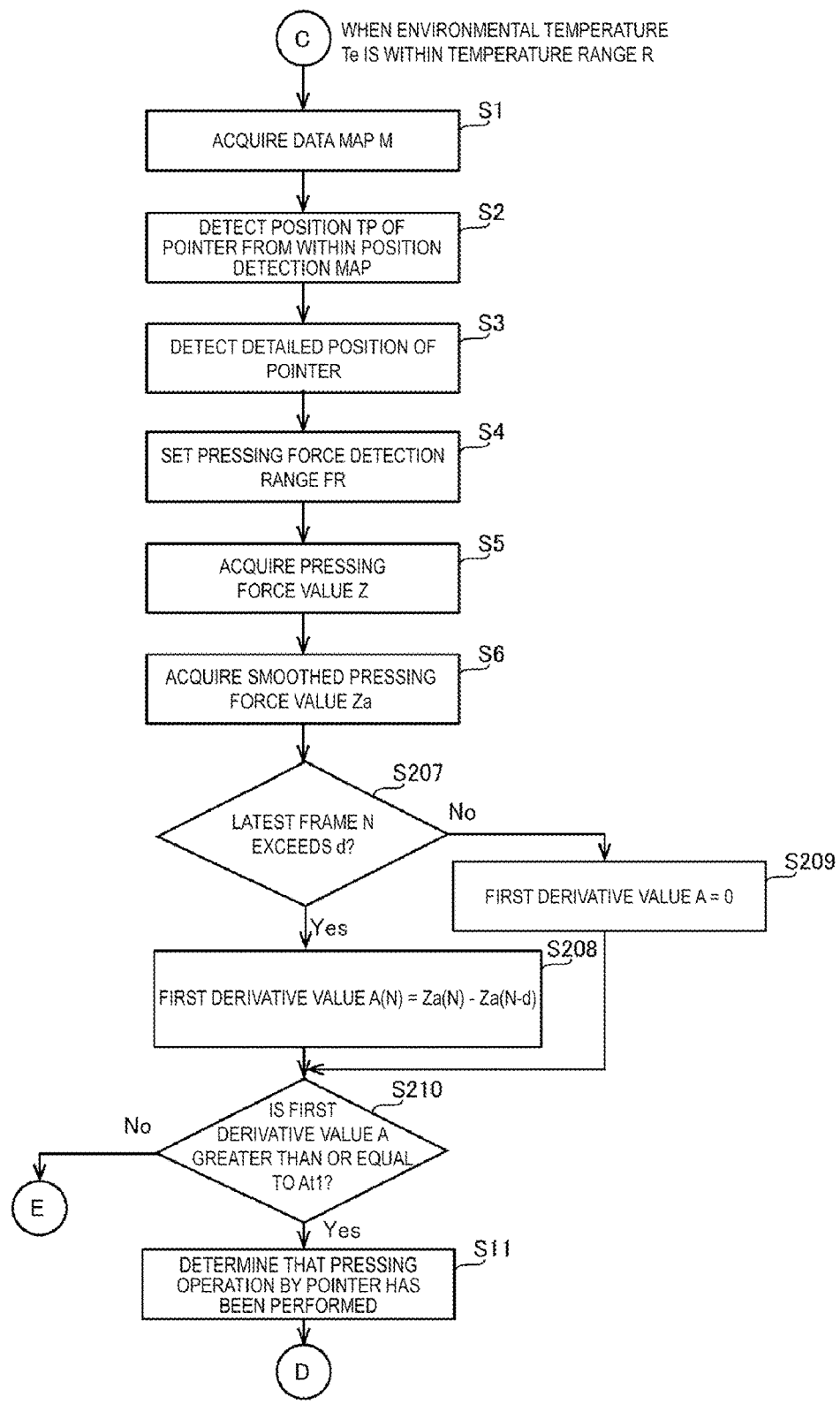
FIG. 22 is a flowchart (2) illustrating control processing according to the second embodiment.
Figure 23:
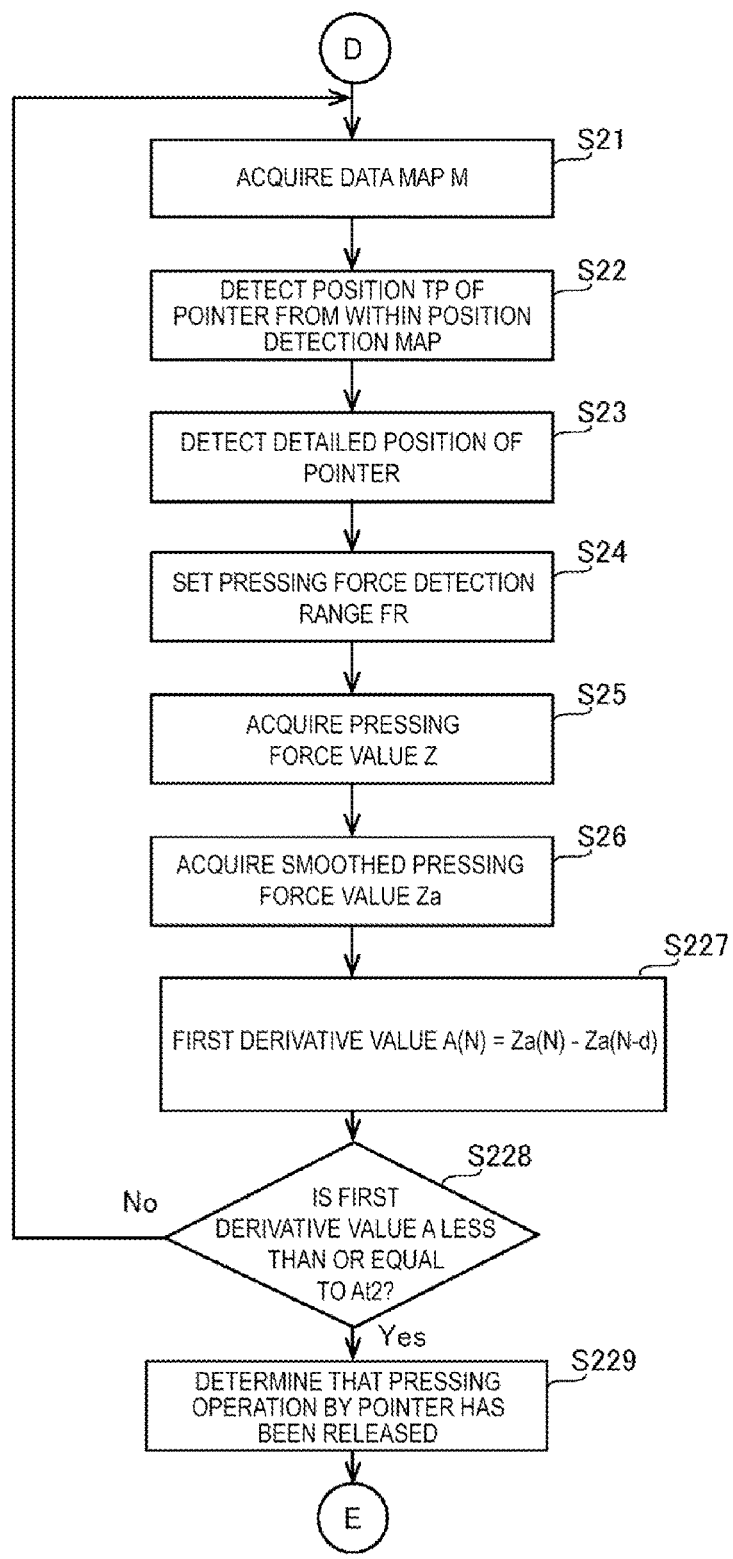
FIG. 23 is a flowchart (3) illustrating control processing according to the second embodiment.

As illustrated in FIG. 22, processing of step S1 to which the process proceeds when the environmental temperature Te is within the temperature range R is executed, and next, steps S2 to S6 are executed. Next, in step S207, it is determined whether the latest frame N exceeds d. If the latest frame N exceeds d, then the process proceeds to step S208, and if the latest frame N does not exceed d, then the process proceeds to step S209.

In step S208, the first derivative value A is evaluated. In step S209, the first derivative value A(N) is determined to be 0. Next, in step S210 after step S208 or step S209, it is determined whether the first derivative value A is equal to or greater than a pressing force detection threshold value At1. When the first derivative value A is not equal to or greater than the pressing force detection threshold value At1, the process returns to step S101 (see FIG. 21), and when the first derivative value A is equal to or greater than the pressing force detection threshold value At1, the process proceeds to step S11. Thereafter, steps S21 to S26 are executed.

In step S227 after step S26, the first derivative value A is evaluated. Next, in step S228, it is determined whether the first derivative value A is equal to or less than a pressing force release detection threshold value At2. When the first derivative value A is equal to or less than the pressing force release detection threshold value At2, the process proceeds to step S229, and when the first derivative value A is not equal to or less than the pressing force release detection threshold value At2, the process returns to step S21. In step S229, it is determined that the pressing operation by the pointer has been released, and the process returns to step S101 (see FIG. 21).

Figure 24:
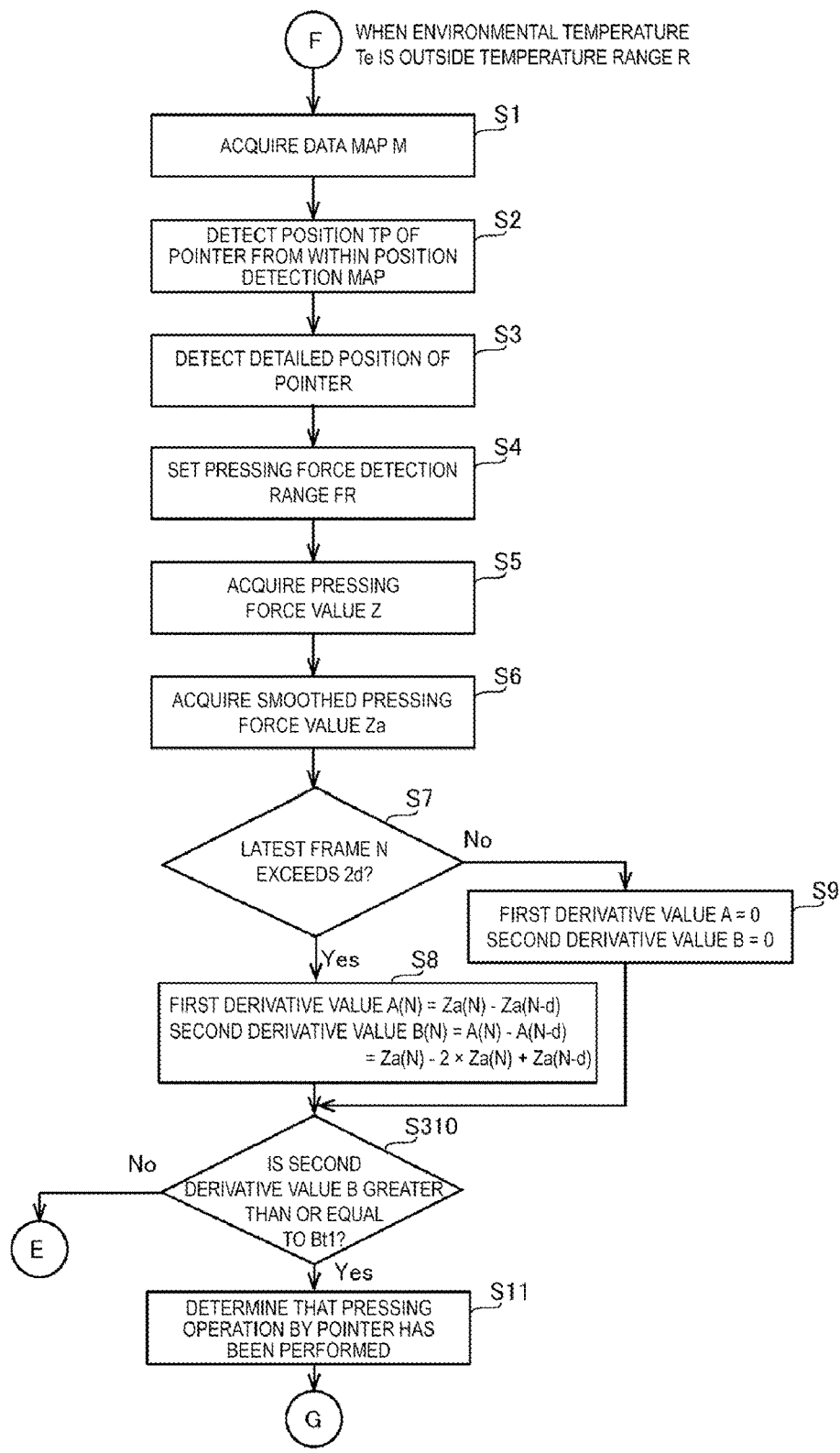
FIG. 24 is a flowchart (4) illustrating control processing according to the second embodiment.
Figure 25:
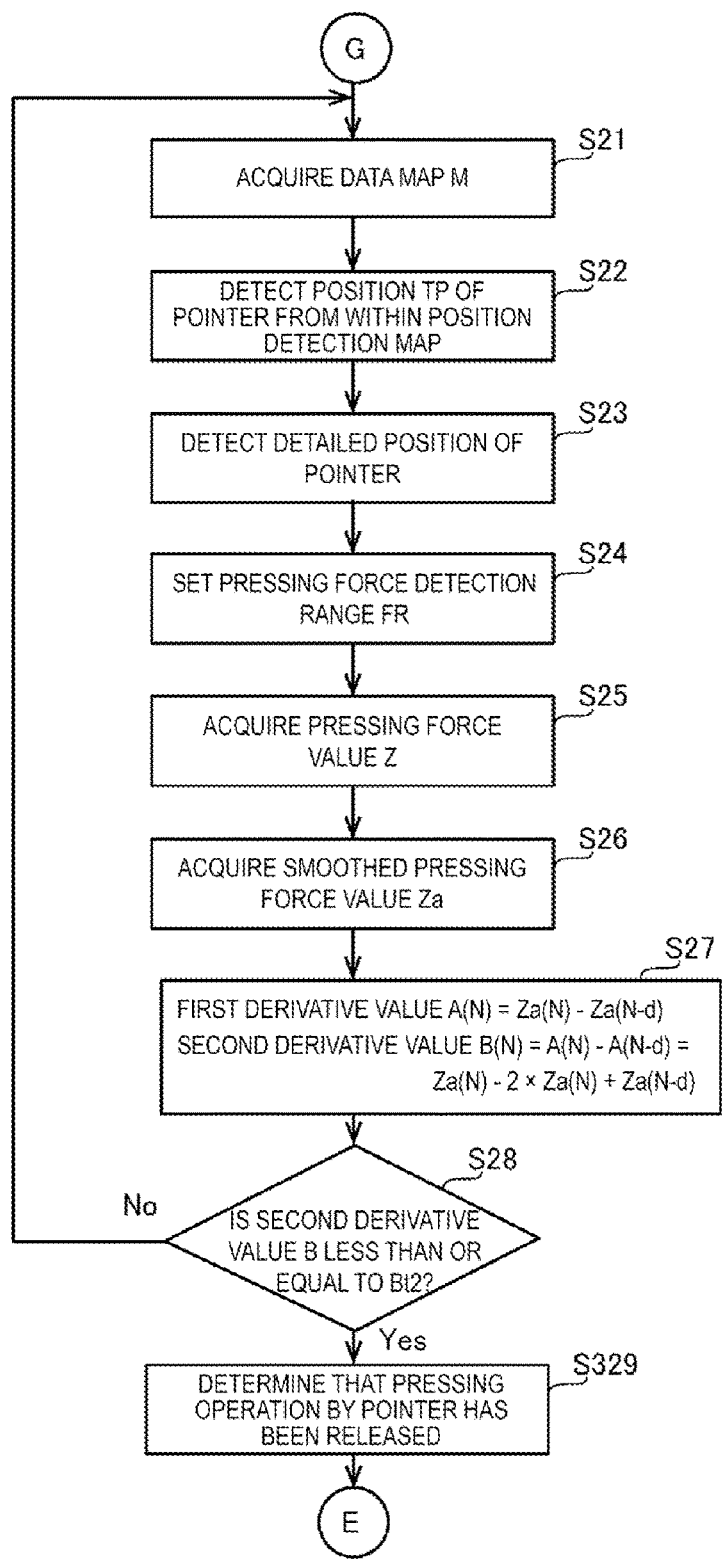
FIG. 25 is a flowchart (5) illustrating control processing according to the second embodiment.

When the environmental temperature Te is outside the temperature range R, the processing of steps S1 to S9 illustrated in FIG. 24 is executed. Thereafter, in step S310, when the second derivative value B is equal to or greater than the pressing force detection threshold value Bt1, the process proceeds to step S11, and when the second derivative value B is not equal to or greater than the pressing force detection threshold value Bt1, the process returns to step S101 (see FIG. 21). When the process proceeds to step S11 and after step S11 is executed, steps S21 to S28 are executed as illustrated in FIG. 25. In step S329 to which the process proceeds when the second derivative value B is equal to or less than Bt2 after step S28 is executed, it is determined that the pressing operation by the pointer has been released, and the process returns to step S101 (see FIG. 21).

In the control method according to the second embodiment, when the environmental temperature Te is within the temperature range R, the temperature difference between the pointer and the touch panel 1 is small, and so the influence of thermal noise is small, and thus it is possible to prevent the thermal noise from being erroneously detected as the pressing operation even by the method of determining the presence or absence of the pressing operation at the pointed position, based on the first derivative value of the pressing force value. As a result, when the environmental temperature Te is within the temperature range R, it is possible to reduce the processing load of the touch panel system 200. When the environmental temperature Te is outside the temperature range R, it is possible to prevent the thermal noise from being erroneously detected as the pressing operation by determining the presence or absence of the pressing operation at the pointed position, based on the second derivative value B.

First Modified Example of Second Embodiment

Next, with reference to FIGS. 26 and 27, a configuration of a touch panel system 300 according to a first modified example of the second embodiment will be described. Unlike the touch panel system 200 according to the second embodiment in which the environmental temperature Te is detected based on the relative dielectric constant ε (capacitance value CL) of the pressure sensitive member 30, the touch panel system 300 according to the first modified example of the second embodiment includes a temperature sensor 301 outside the touch panel 1. Note that, in the following description, when the same reference numerals as those in the first embodiment or the second embodiment are used, the same configurations as those in the first embodiment or the second embodiment are described, and reference is made to the preceding description unless otherwise described.

Figure 26:
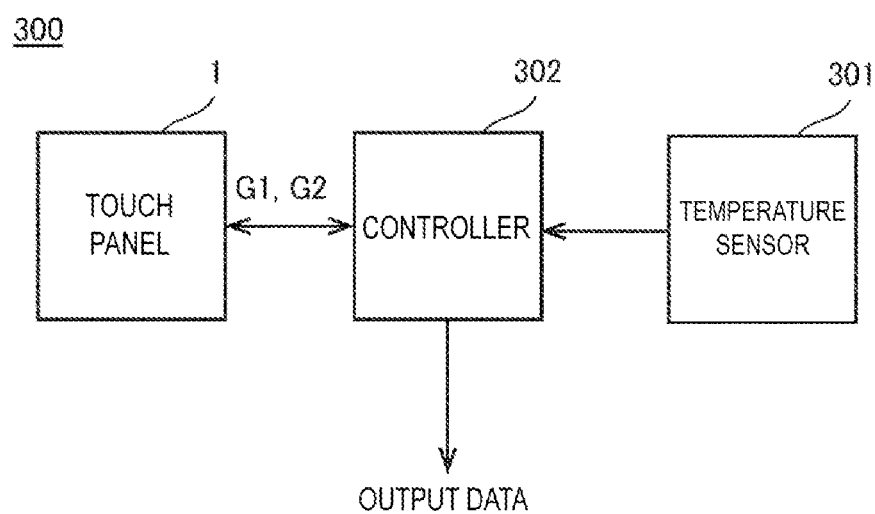
FIG. 26 is a block diagram illustrating a configuration of a touch panel system according to a first modified example of the second embodiment.

As illustrated in FIG. 26, the touch panel system 300 includes the temperature sensor 301 and a controller 302. The temperature sensor 301 is disposed outside the touch panel 1 and detects the environmental temperature Te of the touch panel system 300. The temperature sensor 301 outputs the detected environmental temperature Te to the controller 302.

Figure 27:
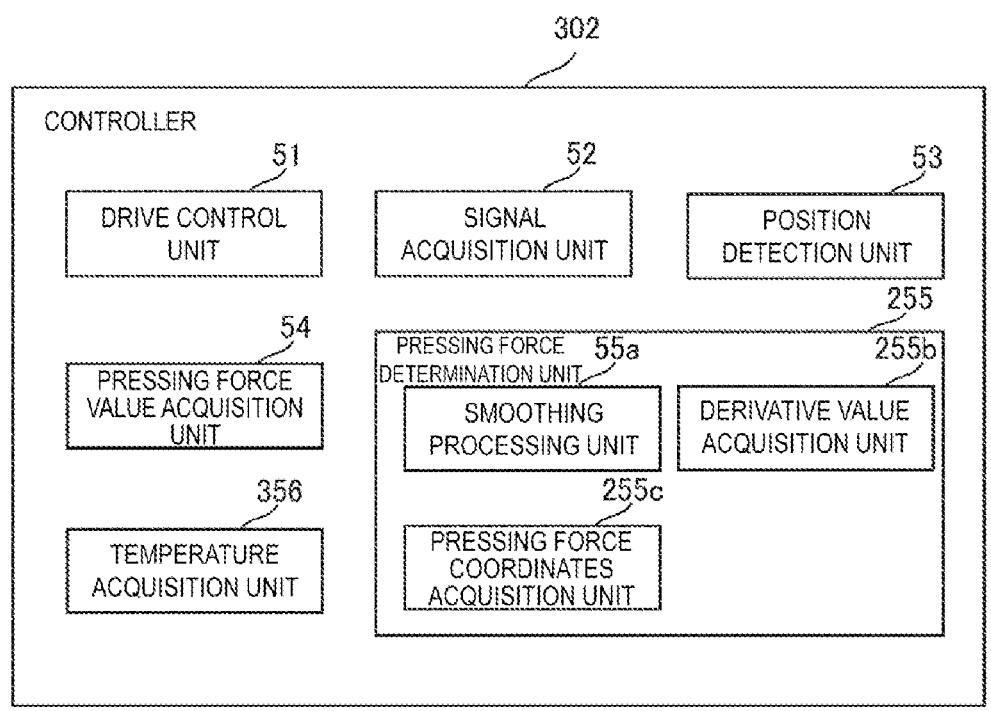
FIG. 27 is a functional block diagram illustrating a controller according to the first modified example of the second embodiment.

As illustrated in FIG. 27, the controller 302 includes a temperature acquisition unit 356. The temperature acquisition unit 356 acquires the environmental temperature Te from the temperature sensor 301. When the acquired environmental temperature Te is within the temperature range R, the pressing force determination unit 255 evaluates the first derivative value A, and when the environmental temperature Te is outside the temperature range R, the pressing force determination unit 255 evaluates the second derivative value B. Similarly to the second embodiment, when the environmental temperature Te is within the temperature range R, the pressing force determination unit 255 determines the presence or absence of the pressing operation, based on the first derivative value A, and when the environmental temperature Te is outside the temperature range R, the pressing force determination unit 255 determines the presence or absence of the pressing operation, based on the second derivative value B. According to the modified example of the second embodiment, unlike the second embodiment, it is possible to acquire the detection result of the environmental temperature Te from the temperature sensor 301 without evaluating the relative dielectric constant ε (capacitance value CL). As a result, it is possible to simplify control processing in the controller 302.

Third Embodiment

Figure 29:
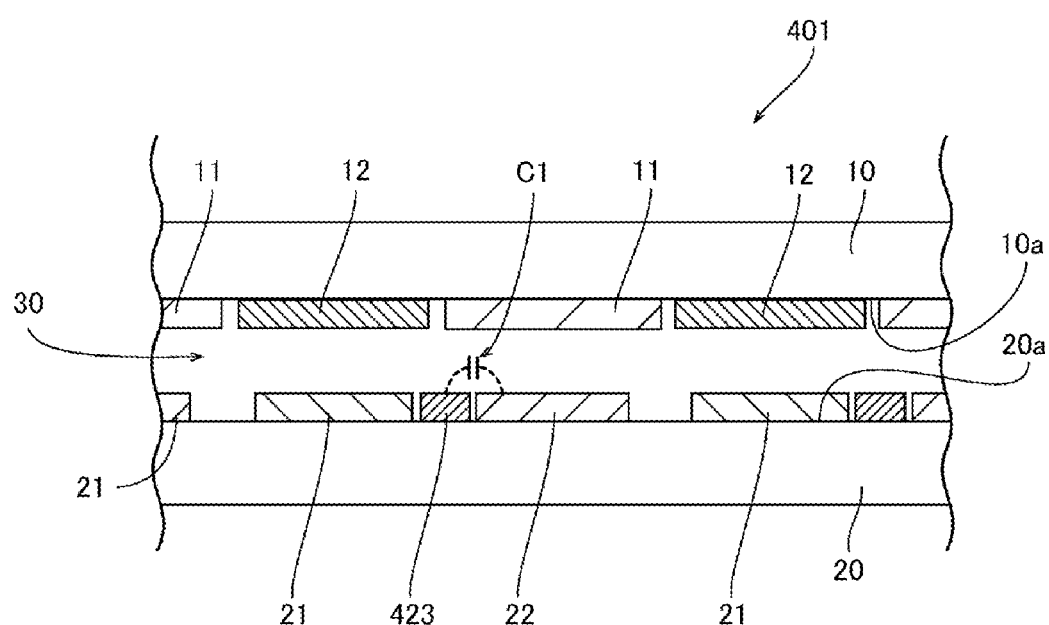
FIG. 29 is a diagram illustrating a configuration of a heat detection electrode according to the third embodiment.
Figure 30:
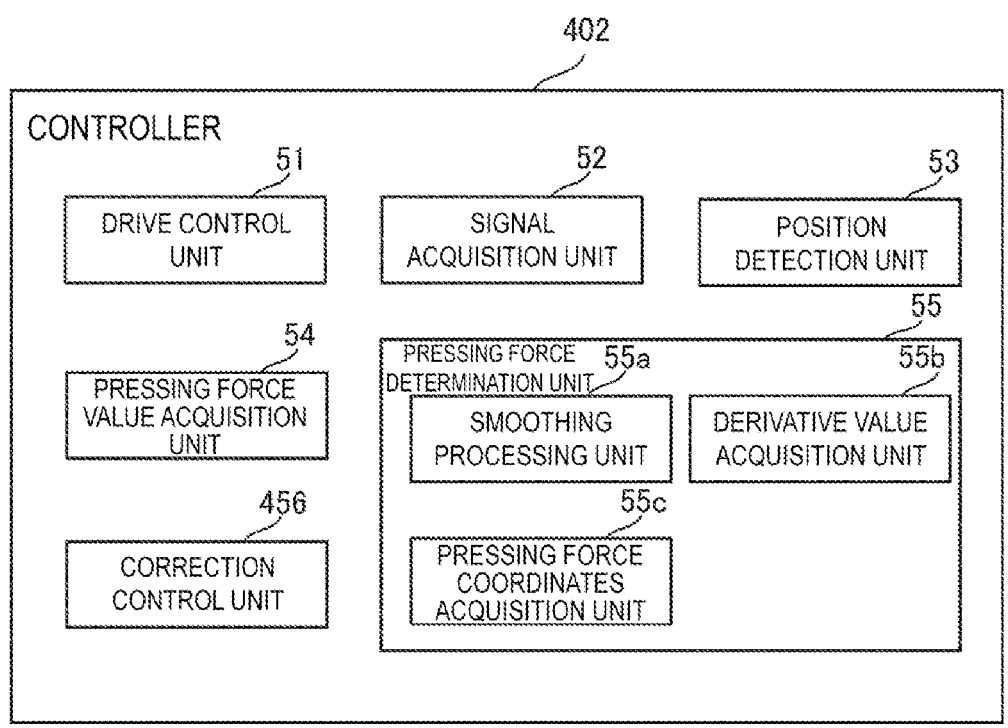
FIG. 30 is a functional block diagram of a controller according to the third embodiment.

Next, with reference to FIGS. 28 to 30, a configuration of a touch panel system 400 according to a third embodiment will be described. The touch panel system 400 of the third embodiment includes a heat detection electrode 423, instead of the shield electrode 23 of the configuration of the touch panel system 100 according to the first embodiment. The touch panel system 400 corrects the pressing force value Z, based on the detection result by the heat detection electrode 423. Note that, in the following description, when the same reference numerals as those in the first embodiment are used, similar configurations to those in the first embodiment are described, and reference is made to the preceding description unless otherwise described.

Figure 28:
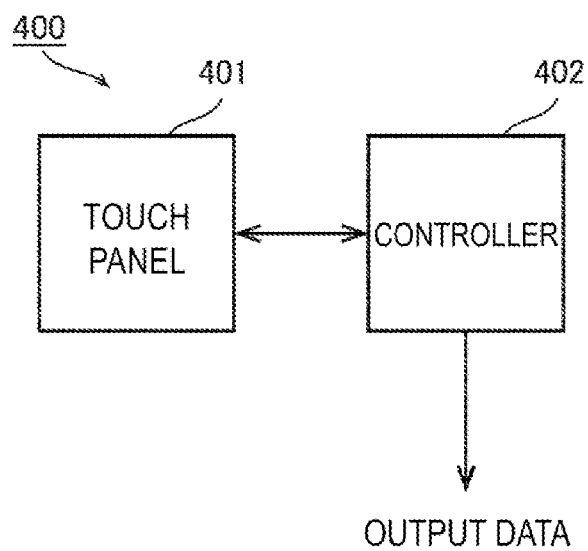
FIG. 28 is a block diagram illustrating a configuration of a touch panel system according to a third embodiment.

As illustrated in FIG. 28, the touch panel system 400 includes a touch panel 401 and a controller 402.

Here, as illustrated in FIG. 20, in the pressure sensitive member 30, the relative dielectric constant ε changes according to a temperature. Therefore, the value of the pressing force value Z changes according to the relative dielectric constant ε. As illustrated in FIG. 29, in the third embodiment, the touch panel 401 includes the heat detection electrode 423. The heat detection electrode 423 is disposed on the second substrate 20. The heat detection electrode 423 is disposed adjacently to the pressing force detection electrode 22. The heat detection electrode 423 is formed of, for example, the same material as the pressing force detection electrode 22. The controller 402 includes a correction control unit 456. The correction control unit 456 applies a drive signal to the drive electrode 11, and then, applies a drive signal to the heat detection electrode 423. The correction control unit 456 acquires a signal from the pressing force detection electrode 22, and based on such a signal, generates a heat detection signal.

The correction control unit 456 corrects the pressing force value Z, based on the heat detection signal. For example, if the pointer comes into contact with the first surface 10a of the first substrate 10, when the environmental temperature around the touch panel 1 is low, the heat is transferred from the pointer to the pressure sensitive member 30. Therefore, in a case of the pressure sensitive member 30 having a characteristic illustrated in FIG. 20, the relative dielectric constant decreases when the temperature increases. Therefore, the capacitance value increases when the temperature increases, and thus, when the capacitance value is proportional to the pressing force value Z, the correction control unit 456 decreases the pressing force value Z according to a magnitude of the heat detection signal. The capacitance value decreases when the temperature decreases, and thus, when the capacitance value is proportional to the pressing force value Z, the correction control unit 456 increases the pressing force value Z according to the magnitude of the heat detection signal. Next, the pressing force determination unit 55 evaluates the second derivative value B, based on the corrected pressing force value Z, and determines the presence or absence of the pressing operation, based on the second derivative value B. According to the third embodiment, it is possible to correct the pressing force value Z, and thus, it is possible to determine more accurately the presence or absence of the pressing operation.

Modifications and the Like

The above-described embodiments are merely examples for carrying out the disclosure. Accordingly, the disclosure is not limited to the embodiments described above and can be implemented by modifying the embodiments described above as appropriate without departing from the scope of the disclosure.

(1) For example, in the above-described first to third embodiments, examples are provided in which the pressing force value Z is smoothed, but the disclosure is not limited thereto. That is, the second derivative value of the pressing force value Z may be calculated without smoothing the pressing force value Z.

Figure 31:
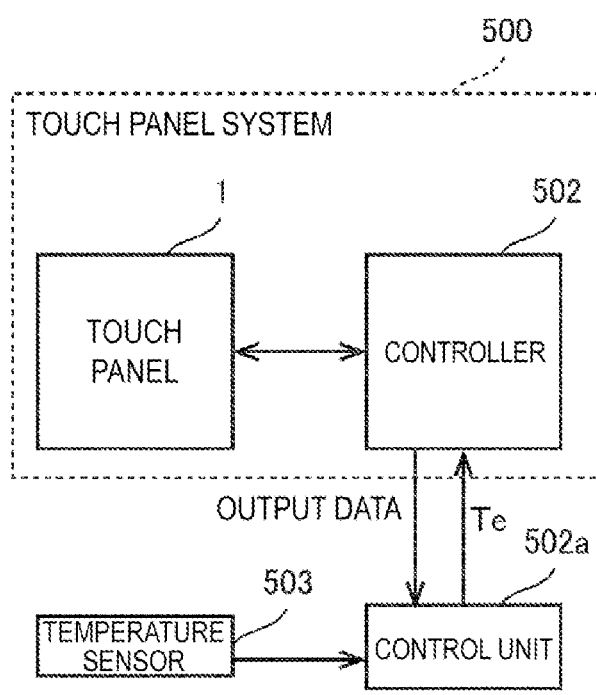
FIG. 31 is a block diagram illustrating a configuration of a touch panel system according to a second modified example of the second embodiment.

(2) In the first modified example of the second embodiment, an example is provided in which the temperature sensor 301 disposed outside the touch panel 1 outputs the detection result to the controller 302, but the disclosure is not limited thereto. For example, as in a touch panel system 500 of the second modified example illustrated in FIG. 31, a temperature sensor 503 configured to measure the environmental temperature Te may be disposed outside the touch panel system 500. In such a case, it is configured so that the controller 502 acquires the environmental temperature Te detected by the temperature sensor 503 from a host (control unit 502a) side.

(3) In the above-described first to third embodiments, examples are provided in which the position of the pointer is detected when the position signal value G1 is equal to or greater than the position detection threshold value G1t continuously for a plurality of times, but the disclosure is not limited thereto. In other words, the position of the pointer may be detected when the position signal value G1 becomes equal to or greater than the position detection threshold value G1t for the first time.

(4) In the above-described first to third embodiments, examples are provided in which the second derivative value B is acquired from a point in time (first frame) when the position signal value G1 is equal to or greater than the position detection threshold value G1t, but the disclosure is not limited thereto. That is, the second derivative value B may be acquired from a point in time after the point in time (first frame) when the position signal value G1 is equal to or greater than the position detection threshold value G1t, or the second derivative value B may be acquired for all the detected pressing force values Z (Za).

(5) In the above-described first to third embodiments, examples are provided in which the second derivative value B is compared with the pressing force detection threshold value Bt1 and the pressing force release detection threshold value Bt2, but the disclosure is not limited thereto. For example, the second derivative value B may be output from the controller as information (output data) indicating the magnitude of the pressing force of the pointer without comparing the second derivative value B with the pressing force detection threshold value Bt1 and the pressing force release detection threshold value Bt2.

(6) In the above-described first and second embodiments, examples are provided in which the touch panel is provided with the floating island electrode 12 and the shield electrode 23, and in the third embodiment, an example is provided in which the touch panel is provided with the floating island electrode 12, but the disclosure is not limited thereto. That is, the floating island electrode 12 and the shield electrode 23 may not be provided in the touch panel.

(7) In the above-described second embodiment, an example is provided in which the relative dielectric constant ε is evaluated to acquire the environmental temperature Te, but the disclosure is not limited thereto. For example, the controller may refer to a table in which the capacitance value CL and the environmental temperature Te are associated with each other to calculate the environmental temperature Te from the capacitance value CL without evaluating the relative dielectric constant ε.

(8) In the above-described first to third embodiments, an example is provided in which the second derivative value B is evaluated by using the above Equations (4) and (5), but the disclosure is not limited thereto. For example, the second derivative value may be evaluated by evaluating a second order approximate expression by performing a second order regression analysis on the pressing force value (smoothed pressing force value) and differentiating the value twice from such a second order approximate expression.

It is possible to describe the above-described configuration as follows.

A touch panel system according to a first configuration includes an electrostatic capacitance type touch panel including a drive electrode, a position detection electrode, and a pressing force detection electrode, and a controller configured to control the electrostatic capacitance type touch panel. The controller provides a drive signal to the drive electrode, acquires a signal value from the position detection electrode, acquires a signal value from the pressing force detection electrode, detects a pointed position by a pointer, based on the signal value acquired from the position detection electrode, acquires a second derivative value of a pressing force value based on the signal value acquired from the pressing force detection electrode, and determines a presence or absence of a pressing operation at the pointed position, based on the second derivative value of the pressing force value (first configuration).

Here, even in a case where the change rate (first derivative value) of the pressing force value due to the thermal noise exceeds the change rate (first derivative value) of the pressing force value due to the pressing force of the pointer, the speed at which the pressing force is transmitted is higher than the speed at which the heat is transmitted in the touch panel. Therefore, the second derivative value of the pressing force value due to the pressing force generated by the pointer is larger than the second derivative value of the pressing force value due to the thermal noise. According to the above first configuration, even when the temperature difference between the pointer and the touch panel is large and the first derivative value A of the pressing force value due to the thermal noise is large, the presence or absence of the pressing operation at the pointed position is determined based on the second derivative value of the pressing force value, and thus it is possible to accurately determine a presence or absence of a pressing operation at the pointed position.

In the first configuration, the controller may be configured to acquire a signal value from the pressing force detection electrode, for each unit time, acquire a first derivative value of the pressing force value based on the signal value acquired from the pressing force detection electrode and a signal value acquired a plurality of times before the acquisition of the signal value, and acquire a second derivative value of the pressing force value based on the first derivative value of the pressing force value and a first derivative value acquired a plurality of times before the acquisition of the first derivative value (second configuration).

Here, the touch panel is characterized by that a change in capacitance (pressing force value) caused by a change in dielectric constant due to a change in temperature is gentler than a change in capacitance (pressing force value) caused by a pressing. Thus, it is possible to increase a signal by increasing a time interval for differentiating for evaluating the second derivative value. Therefore, according to the second configuration, the second derivative value of the pressing force value is acquired based on the first derivative value acquired a plurality of times before a current time, and thus, it is possible to increase the signal. As a result, it is possible to improve detection accuracy.

In the first or second configuration, the touch panel system may further include a temperature detection device configured to detect an environmental temperature of an electrostatic capacitance type touch panel. The controller may be configured to determine the presence or absence of the pressing operation at the pointed position, based on the second derivative value of the pressing force value, when the environmental temperature is outside a temperature range including the temperature of the pointer, and determine the presence or absence of the pressing operation at the pointed position, based on the first derivative value of the pressing force value, when the environmental temperature is within the temperature range (third configuration).

According to the third configuration, when the environmental temperature is within a reference temperature range, the influence of thermal noise is small, and thus, it is possible to accurately determine the presence or absence of the pressing operation even by the method of determining the presence or absence of the pressing operation at the pointed position, based on the first derivative value of the pressing force value. As a result, when the environmental temperature is within the reference temperature range, it is possible to reduce the processing load of the pressing force determination unit, and, when the environmental temperature is outside the reference temperature range, it is possible to accurately determine the presence or absence of the pressing operation at the pointed position, based on the second derivative value of the pressing force value.

In the third configuration, the electrostatic capacitance type touch panel may further include a pressure sensitive member interposed between the position detection electrode and the pressing force detection electrode. The temperature detection device may be configured to detect an electric capacitance formed by the position detection electrode and the pressing force detection electrode, evaluate a dielectric constant of the pressure sensitive member, based on the detected electric capacitance, and evaluate the environmental temperature, based on the evaluated dielectric constant (fourth configuration).

According to the fourth configuration, it is possible to evaluate the environmental temperature by using the pressure sensitive member interposed between the position detection electrode and the pressing force detection electrode. Therefore, it is not necessary to provide a temperature sensor separately from the touch panel.

In the third configuration, the temperature detection device may further include a temperature sensor disposed outside the electrostatic capacitance type touch panel, the temperature sensor being configured to detect the environmental temperature of the electrostatic capacitance type touch panel (fifth configuration).

According to the fifth configuration, unlike a case where the electric capacitance of the pressure sensitive member is detected, the dielectric constant is evaluated based on the detected electric capacitance, and the environmental temperature is evaluated based on the evaluated dielectric constant, it is possible to acquire the detection result of the environmental temperature from the temperature sensor without evaluating the dielectric constant. As a result, it is possible to simplify control processing in the temperature detection device.

In any one of the first to fifth configurations, the electrostatic capacitance type touch panel may further include a heat detection electrode. The controller may be configured to supply a drive signal to the drive electrode and the heat detection electrode, and correct a signal value acquired from the pressing force detection electrode with a heat detection signal obtained from a change in coupling capacitance between the heat detection electrode and the pressing force detection electrode (sixth configuration).

According to the sixth configuration, it is possible to correct the signal value acquired from the pressing force detection electrode, and thus, it is possible to determine more accurately the presence or absence of the pressing operation.

A display device according to a seventh configuration is a display device including a touch panel system and a display configured to display an image, the touch panel system being disposed on a display surface of the display, in which the touch panel system includes an electrostatic capacitance type touch panel including a drive electrode, a position detection electrode, and a pressing force detection electrode, and a controller configured to control the electrostatic capacitance type touch panel, and the controller provides a drive signal to the drive electrode, acquires a signal value from the position detection electrode, acquires a signal value from the pressing force detection electrode, detects a pointed position by a pointer, based on the signal value acquired from the position detection electrode, acquires a second derivative value of a pressing force value based on the signal value acquired from the pressing force detection electrode, and determines a presence or absence of a pressing operation at the pointed position, based on the second derivative value of the pressing force value (seventh configuration).

In the display device according to the seventh configuration, it is possible to accurately determine a presence or absence of a pressing operation at a pointed position even when a temperature difference between a pointer and a touch panel is large and the temperature of the touch panel changes due to the pointer touching the touch panel.

A method for controlling a touch panel system according to an eighth configuration is a method for controlling a touch panel system including an electrostatic capacitance type touch panel including a drive electrode, a position detection electrode, and a pressing force detection electrode, the method including providing a drive signal to the drive electrode, acquiring a signal value from the position detection electrode, acquiring a signal value from the pressing force detection electrode, detecting a pointed position by a pointer, based on the signal value acquired from the position detection electrode, acquiring a second derivative value of a pressing force value based on the signal value acquired from the pressing force detection electrode, and determining a presence or absence of a pressing operation at the pointed position, based on the second derivative value of the pressing force value (eighth configuration).

In the method for controlling a touch panel system according to the eighth configuration, it is possible to accurately determine a presence or absence of a pressing operation at a pointed position even when a temperature difference between a pointer and a touch panel is large and the temperature of the touch panel changes due to the pointer touching the touch panel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A touch panel system comprising:
an electrostatic capacitance type touch panel including a drive electrode, a position detection electrode, and a pressing force detection electrode;
a temperature detection device configured to detect an environmental temperature of the electrostatic capacitance type touch panel; and
a controller configured to control the electrostatic capacitance type touch panel,
wherein the controller:
provides a drive signal to the drive electrode, acquires a signal value from the position detection electrode,
acquires a signal value from the pressing force detection electrode,
detects a pointed position by a pointer based on the signal value acquired from the position detection electrode,
acquires a first derivative value and a second derivative value of a pressing force value based on the signal value acquired from the pressing force detection electrode,
determines a presence or an absence of a pressing operation at the pointed position based on the second derivative value of the pressing force value when the environmental temperature is outside a temperature range including a temperature of the pointer, and
determines the presence or the absence of the pressing operation at the pointed position, based on the first derivative value of the pressing force value, when the environmental temperature is within the temperature range.

2. The touch panel system according to claim 1,
wherein
the signal value is acquired from the pressing force detection electrode for each unit of time,
the first derivative value of the pressing force value is acquired based on the signal value acquired from the pressing force detection electrode and another signal value acquired a plurality of times before the acquisition of the signal value from the pressing force detection electrode, and
the second derivative value of the pressing force value is acquired based on the first derivative value of the pressing force value and another first derivative value acquired a plurality of times before the acquisition of the first derivative value.

3. The touch panel system according to claim 1,
wherein the electrostatic capacitance type touch panel further includes a pressure sensitive member interposed between the position detection electrode and the pressing force detection electrode, and
the temperature detection device:
detects an electric capacitance formed by the position detection electrode and the pressing force detection electrode,
evaluates a dielectric constant of the pressure sensitive member based on the detected electric capacitance, and
evaluates the environmental temperature based on the evaluated dielectric constant.

4. The touch panel system according to claim 1,
wherein the temperature detection device further comprises a temperature sensor disposed outside the electrostatic capacitance type touch panel, the temperature sensor being configured to detect the environmental temperature of the electrostatic capacitance type touch panel.

5. A touch panel system comprising:
an electrostatic capacitance type touch panel including a drive electrode, a position detection electrode, a pressing force detection electrode, and a heat detection electrode; and
a controller configured to control the electrostatic capacitance type touch panel:
wherein the controller:
provides a drive signal to the drive electrode,
acquires a signal value from the position detection electrode,
acquires a signal value from the pressing force detection electrode,
detects, a pointed position by a pointer based on the signal value acquired from the position detection electrode,
acquires a second derivative value of a pressing force value based on the signal value acquired from the pressing force detection electrode,
determines a presence or an absence of a pressing operation at the pointed position based on the second derivative value of the pressing force value,
supplies another drive signal to the drive electrode and the heat detection electrode, and
corrects the signal value acquired from the pressing force detection electrode with a heat detection signal obtained from a change in coupling capacitance between the heat detection electrode and the pressing force detection electrode.

6. A display device comprising:
a touch panel system; and
a display configured to display an image, the touch panel system being disposed on a display surface of the display,
wherein the touch panel system includes:
an electrostatic capacitance type touch panel including a drive electrode, a position detection electrode, and a pressing force detection electrode;
a temperature detection device configured to detect an environmental temperature of the electrostatic capacitance type touch panel; and
a controller configured to control the electrostatic capacitance type touch panel, wherein the controller:
provides a drive signal to the drive electrode,
acquires a signal value from the position detection electrode, acquires a signal value from the pressing force detection electrode, detects a pointed position by a pointer based on the signal value acquired from the position detection electrode, acquires a first derivative value and a second derivative value of a pressing force value based on the signal value acquired from the pressing force detection electrode, determines a presence or an absence of a pressing operation at the pointed position based on the second derivative value of the pressing force value when the environmental temperature is outside a temperature range including a temperature of the pointer, and determines the presence or the absence of the pressing operation at the pointed position, based on the first derivative value of the pressing force value, when the environmental temperature is within the temperature range.

7. A method for controlling a touch panel system including an electrostatic capacitance type touch panel and a temperature detection device configured to detect an environmental temperature of the electrostatic capacitance type touch panel, the electrostatic capacitance type touch panel having a drive electrode, a position detection electrode, and a pressing force detection electrode, the method comprising:

providing a drive signal to the drive electrode;

acquiring a signal value from the position detection electrode; acquiring a signal value from the pressing force detection electrode;

detecting a pointed position by a pointer based on the signal value acquired from the position detection electrode;

acquires a first derivative value and a second derivative value of a pressing force value based on the signal value acquired from the pressing force detection electrode;

determining a presence or an absence of a pressing operation at the pointed position based on the second derivative value of the pressing force value when the environmental temperature is outside a temperature range including a temperature of the pointer; and determining the presence or the absence of the pressing operation at the pointed position, based on the first derivative value of the pressing force value, when the environmental temperature is within the temperature range.

* * * * *